US009766931B2

(12) United States Patent
Shah et al.

(10) Patent No.: US 9,766,931 B2
(45) Date of Patent: Sep. 19, 2017

(54) UNIPROCESSOR SCHEDULABILITY TESTING FOR NON-PREEMPTIVE TASK SETS

(71) Applicant: Massachusetts Institute of Technology, Cambridge, MA (US)

(72) Inventors: Julie Ann Shah, Boston, MA (US); Matthew Craig Gombolay, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 403 days.

(21) Appl. No.: 13/873,541

(22) Filed: Apr. 30, 2013

(65) Prior Publication Data

US 2013/0290970 A1    Oct. 31, 2013

Related U.S. Application Data

(60) Provisional application No. 61/640,132, filed on Apr. 30, 2012.

(51) Int. Cl.
*G06F 9/48* (2006.01)
*G06F 9/46* (2006.01)

(52) U.S. Cl.
CPC ................... *G06F 9/4887* (2013.01)

(58) Field of Classification Search
None
See application file for complete search history.

(56) References Cited

U.S. PATENT DOCUMENTS

| 6,393,433 | B1* | 5/2002 | Kalavade | G06F 11/3419 |
| 2001/0034558 | A1* | 10/2001 | Hoskins | G05B 19/045 |
| | | | | 700/13 |
| 2005/0055697 | A1* | 3/2005 | Buco et al. | 718/105 |
| 2005/0060709 | A1* | 3/2005 | Kanai et al. | 718/100 |
| 2005/0283534 | A1* | 12/2005 | Bigagli | G06F 8/65 |
| | | | | 709/229 |
| 2008/0162965 | A1 | 7/2008 | Marinas et al. | |
| 2014/0351819 | A1 | 11/2014 | Shah et al. | |

OTHER PUBLICATIONS

Attiya, Hagit, et al. (2012) "A Single-Version STM that is Multi-Versioned Permissive," Theory Comput. Syst., 51(4):425-446.

(Continued)

*Primary Examiner* — Eric C Wai
(74) *Attorney, Agent, or Firm* — Goodwin Procter LLP

(57) ABSTRACT

A method of determining schedulability of tasks for uniprocessor execution includes defining a well-formed, non-preemptive task set having a plurality of tasks, each task having at least one subtask. A determination of whether the task set is schedulable is made, such that a near-optimal amount of temporal resources required to execute the task set is estimated. Further, a method of determining schedulability of a subtask for uniprocessor execution includes defining a well-formed, non-preemptive task set having a plurality of tasks, each task having at least one subtask. A determination of whether a subtask in the task set is schedulable at a specific time is made in polynomial time. Systems for implementing such methods are also provided.

29 Claims, 10 Drawing Sheets

(56) References Cited

OTHER PUBLICATIONS

Baptiste, Philippe, et al., (1996) "Edge-Finding Consraint Propagation Algorithms for Disjunctive and Cumulative Scheduling," In Proc. Workshop of the U.K. Planning and Special Interest Group, (6 pages).
Barnes, Michael J., et al. (2011) "Designing Effective Soldier-Robot Teams in Complex Environments: Training, Interfaces, and Individual Differences," In EPCE, pp. 484-493.
Bohme, D., et al., (2001) "Runway Operations Planning and Control: Sequences and Scheduling," IEEE, pp. 1-12.
Brunet, L., et al., (2008) "Consensus-Based Auction Approaches for Decentralized Task Assignment," In AIAA Guidance, Navigation, and Control Conference (GNC), pp. 1-24.
Buttazzo, Giorgio C., (2005) "Slack Stealing," In Hard Real-Time Computing Systems, Section 5.7, pp. 139-142.
Castañón, David A., et al. (2003) "Distributed Algorithms for Dynamic Reassignment," In IEEE Conference on Decision and Control, vol. 1, pp. 13-18.
Castro, E., et al. (2012) "Combined mathematical programming and heuristics for a radiotherapy pre-treatment scheduling problem," 15(3):333-346.
Cates, J. (2011) "Route optimization under uncertainty for unmanned underwater vehicles," Master's Thesis at Massachusetts Institute of Technology, pp. 1-87.
Chen, J., et al. (2009) "Project selection, scheduling and resource allocation with time dependent returns," European Journal of Operational Research, 193:23-34.
Chetto, H., et al. (1990) "Dynamic Scheduling of Real-Time Tasks under Precedence Constraints," The Journal of Real-Time Systems, 2:181-194.
Christie, Dave, et al. (2010) "Evaluation of AMD's Advanced Synchronization Facility Within a Complete Transactional Memory Stack," EuroSys'10, pp. 27-40.
Clare, Andrew S., et al. (2012) "Operator Objective Function Guidance for a Real-Time Unmanned Vehicle Scheduling Algorithm," Journal of Aerospace Computing, Information and Communication, 9(4):161-173.
Cucu-Grosjean, L., et al. (2003) "Schedulability condition for real-time systems with precedence and periodicity constraints, without preemption," In Proc. International Conference on Real-Time Systems, pp. 1-9.
Cucu-Grosjean, L., et al. (2008) "Periodic real-time scheduling: from deadline-based model to latency- based model," Annals of Operations Research, 159:41-51.
Cucu-Grosjean, L., et al. (2002) "Real-time scheduling for systems with precedence, periodicity and latency constraints," In Proc. International Conference on Real-Time Systems, 15 pages.
Cummings, Mary L., et al., (2007) Operator Performance and Intelligent Aiding in Unmanned Aerial Vehicle Scheduling. IEEE Intelligent Systems, 22(2):52-59.
Dechter, Rina, et al. (1991) "Temporal constraint networks," Artificial Intelligence, 49(1):61-91.
Devi, U.C. (2002) "An Improved Schedulability Test for Uniprocessor Periodic Task Systems," In Proc. Euromicro Conference on Real-Time Systems, pp. 1-20.
Durfee, Edmund H., et al., (2014) "Using hybrid scheduling for the semi-autonomous formation of expert teams," Future Generation Computer Systems, 31:200-212.
Garey, Michael R., et al. (1976) "The complexity of flowshop and jobshop scheduling," Mathematics of Operations Research, 1(2):117-129.
Gombolay, Matthew C., et al. (2012) "A Uniprocessor Scheduling Policy for Non-Preemptive Task Sets with Precedence and Temporal Constraints," In Proc. AIAA, pp. 1-14.
Gombolay, Matthew C., (2013) "Fast Methods for Scheduling with Applications to Real-Time Systems and Large-Scale, Robotic Manufacturing of Aerospace Structures," Abstract, TOC, Bibliography, (14 pages).

Goodrich, Michael A. et al., (2009) "Towards Using UAVs in Wilderness Search and Rescue: Lessons from Field Trials," Interaction Studies, 10(3):453-478.
Gurobi Optimization webpage retrieved on Oct. 17, 2014 at: gurobi.com/products/gurobi-optimizer/gurobi-overview> (5 pages).
Harbour, Michael González, et al., (2003) "Response Time Analysis for Tasks Scheduled under EDF within Fixed Priorities," In Proc. Real-Time Systems Symposium (RTSS), pp. 1-10.
Hooker, John N. (2004) "A Hybrid Method for Planning and Scheduling," In Proc. Carnegie Mellon University Research Showcase, (13 pages).
International Search Report and Written Opinion for International Patent Application No. PCT/US2013/038841 dated Aug. 20, 2014 (12 pages).
Jain, V., et al., (2001) "Algorithms for Hybrid MILP/CP Models for a Class of Optimization Problems," Journal on Computing, 13(4):258-276.
Jones, Henry L., et al., (2002) "Autonomous Robots in SWAT Applications: Research, Design, and Operations Challenges," AU-VSI, (15 pages).
Kim, In-Guk, et al., (1995) "Real-Time Scheduling of Tasks that Contain the External Blocking Intervals," IEEE, pp. 54-59.
Kushleyev, A., et al. (2012) "Towards a Swarm of Agile Micro Quadrotors," Robotics: Science and Systems (RSS), (8 pages).
Lakshmanan, Karthik, et al., (2010) "Scheduling Self-Suspending Real-Time Tasks with Rate-Monotonic Priorities," In Proc. Real-Time and Embedded Technology and Applications Symposium (RTAS), pp. 1-10.
Liu, Cong., et al., (2009) "Task Scheduling with Self-Suspensions in Soft Real-Time Multiprocessor Systems," In Proc. Real-Time Systems Symposium (RTSS), (12 pages).
Liu, Cong, et al., (2012) "An O(m) Analysis Technique for Supporting Real-Time Self-Suspending Task Systems," In Proc. Real-Time Systems Symposium (RTSS), (10 pages).
McLain, Timothy, et al., (2005) "Coordination Variables, Coordination Functions, and Cooperative Timing Missions," pp. 1-34.
Murphy, Robin Roberson (2004) "Human-Robot Interaction in Rescue Robotics," IEEE Transactions on Systems, Man and Cybernetics, 34(2):138-153.
Muscettola, Nicola, et al., (1998) "Reformulating Temporal Plans for Efficient Execution," In Proc. Principles of Knowledge Representation and Reasoning (KR&R), (9 pages).
Ozguner, U., et al. (2003) "Battle Management for Unmanned Aerial Vehicles," IEEE, pp. 3585-3590.
Parasuraman, Raja, et al., "Adaptive Aiding and Adpative Task Allocation Enchance Human-Machine Interaction," pp. 119-123.
Parasuraman, Raja, et al., (2010) "Complacency and Bias in Human Use of Automation: An Attentional Integration," Human Factors, 52(3):381-410.
Rajkumar, R. (1991) "Dealing with Self-Suspending Periodic Tasks," Technical report, IBM Thomas J. Watson Research Center, (20 pages).
Rasmussen, Steven J., et al., (2005) "UAV Team Decision and Control using Efficient Collaborative Estimation," In Proc. American Control Conference (ACC), vol. 6, pp. 4107-4112.
Ren, Huizhi et al., (2009) An Improved Hybrid MILP/CP Algorithm Framework for the Job-Shop Scheduling, in Proc. IEEE International Conference on Automation and Logistics, pp. 890-894.
Richard, Pascal (2003) "On the Complexity of Scheduling Real-Time Tasks with Self-Suspensions on One Processor," In Proc. Euromicro Conference on Real-Time Systems (ECRTS), (8 pages).
Ridouard, Frédéric, et al., (2004) "Negative results for scheduling independent hard real-time tasks with self-suspensions," In Proc. Real-Time and Network Systems, pp. 1-10.
Smith, D., et al. (2000) "Bridging the gap between planning and scheduling," Knowledge Engineering Review, 15(1):1-34.
Stankovic, John A., et al., (1995) "Implications of Classical Scheduling Resuts for Real-Time Systems," IEEE, pp. 16-25.
Sun, Jun., et al. (1996) "Synchronization Protocols in Distributed Real-Time Systems," In Proc. International Conference on Distributed Computing Systems, pp. 38-45.

(56) References Cited

OTHER PUBLICATIONS

Tan, Wei, et al., (2000) "Integration of process planning and scheduling—a review," Journal of Intelligent Manufacturing, 11:51-63.
Tindell, Ken, et al., (1994) "Holistic schedulability analysis for distributed hard real-time systems," In Proc. Microprocessing and Microprogramming, 40:117-134.
Vilím, Petr, et al., (2005) "Extension of O(n log n) Filtering Algorithms for the Unary Resource Constraint to Optional Activities," Constraints, 10(4):403-425.
Wilcox, Ronald, et al., (2012) "Optimization of Temporal Dynamics for Adaptive Human-Robot Interaction in Assembly Manufacturing," In Proc. Robotics: Science and Systems (RSS), (8 pages).
Zhao, H., et al. (2007) "Worst case response time analysis of sporadic task graphs with EDF non-preemptive scheduling on a uniprocessor," IEEE, (6 pages).
International Search Report and Written Opinion for International Patent Application No. PCT/US2014/039136 dated Oct. 6, 2014 (10 pages).

* cited by examiner

```
testDeadline(τ, D^{abs}, j)
 1:  τ|_j ← NULL
 2:  for x = 1 to |τ| do
 3:      z ← j
 4:      while TRUE do
 5:          if τ_x^{z+1} ∉ (τ_{free} ∪ τ_{embedded}) then
 6:              break
 7:          else if τ_x^{z+1} ∈ τ_{free} then
 8:              break
 9:          else if τ_x^{z+1} ∈ τ_{embedded} then
10:              z ← z + 1
11:         end if
12:     end while
13:     τ_x|_j ← (φ_x, (C_x^1, E_x^1, C_x^2 ... C_x^z), D_x, T_x)
14: end for
15: if H_{UB}^{τ|_j} ≤ D^{abs} then
16:     return TRUE
17: else
18:     return FALSE
19: end if
```

FIG. 8

```
constructTaskSuperSet (τ)
1:   τ* ← Initialize to τ
2:   I[i] ← 1, ∀i ∈ N
3:   J[i] ← m_i, ∀i ∈ N
4:   D[i][k] ← m_i, ∀i ∈ N, k = 1
5:   counter ← 2
6:   H_LB ← 0
7:   while TRUE do
8:       if I[i] = H/T_i, ∀i ∈ N then
9:           break
10:      end if
11:      H_LB ← H_LB + Σ_{i=1}^{n} C_i * (counter-1)
12:      for i = 1 to n do
13:          if I[i] < H/T_i then
14:              if counter > J[i] then
15:                  if H_LB ≥ T_i * I[i] + φ_i then
16:                      I[i] ← I[i]+1
17:                      τ_i*(counter + y -1) ←
                             τ_i^y, ∀y ∈ {1, 2, ... m_i}
18:                      J[i] = counter + m_i - 1
19:                      D[i][I[i]] ← J[i]
20:                  end if
21:              end if
22:          end if
23:      end for
24:      if counter > max_i J[i] then
25:          H_LB ≥ min_i(T_i * I[i] + φ_i)
26:      else
27:          counter ← counter +1
28:      end if
29:  end while
30:  // Test Task Deadlines for Each Instance
31:  for i = 1 to n do
32:      for k = 1 to H/T_i do
33:          D_{i,k} ← D_i + T_i(k-1) + φ_i
34:          j ← D[i][k]
35:          if testDeadline (τ*,D_{i,k},j) = FALSE then
36:              return NULL
37:          end if
38:      end for
39:  end for
40:  return τ*
```

FIG. 9

```
JSFSchedulingAlgorithm(τ)

1:  τ* ← constructTaskSuperSet (τ)
 2:  if τ* = ∅ then
 3:      return FALSE
 4:  end if
 5:  D^ref* ← simplifyIntraTaskDeadlines (D^ref*)
 6:  t ← 0
 7:  while TRUE do
 8:      if processor is idle then
 9:          availableSubtasks ← getAvailableSubtasks(t);
10:          for (k=1 to |availableTasks|) do
11:              τ_i^j ← availableTasks[k];
12:              if russianDollsTest (τ_i^j) then
13:                  t_s ← t
14:                  t_s ← t_s + C_i^j
15:                  scheduleProcessor (τ_i^j, t_s, t_f)
16:                  break
17:              end if
18:          end for
19:      end if
20:      if all tasks in τ* have been finished then
21:          return TRUE
22:      else
23:          t ← t + 1
24:      end if
25:  end while
```

FIG. 11

```
russianDollsTest (τ_i^j, t)

1: for r = 1 to |τ_active ∩ τ_next| do
2:     τ_x^y ← {τ_active ∩ τ_next}(r)
3:     if τ_x^y ≠ t_i^j then
4:         if C_i^j > t_δ|_x^y then
5:             return false
6:         end if
7:         if ∃D_{(i,j),(j,b)}^{rel} then
8:             if ¬((t_max|_x^y ≤ t_δ|_i^{j+1}) ∨ (t_δ|_x^y ≥ t_max|_i^{j+1})) then
9:                 return false
10:            end if
11:        end if
12:    end if
13: end for
```

FIG. 12

UNIPROCESSOR SCHEDULABILITY TESTING FOR NON-PREEMPTIVE TASK SETS

CROSS-REFERENCE TO RELATED APPLICATION

This application claims priority to and the benefit of U.S. Provisional Patent Application No. 61/640,132, filed Apr. 30, 2012, and entitled "Uniprocessor Schedulability Test and Scheduler for Task Sets with Well-Formed Precedence Relations, Temporal Deadlines, and Wait Constraints," the entirety of which is hereby incorporated herein by reference.

STATEMENT REGARDING FEDERALLY SPONSORED RESEARCH OR DEVELOPMENT

This invention was made with government support under Grant No. DGE1122374 awarded by the National Science Foundation. The government has certain rights in the invention.

TECHNICAL FIELD

This description relates generally to real-time processor scheduling and, in particular, to methods and systems for testing schedulability of non-premptive task sets with hard scheduling deadlines.

BACKGROUND INFORMATION

Increasingly in real-time systems, computer processors must handle the self-suspension of tasks and determine the feasibility of these task sets. Self-suspensions can result both due to hardware and software architecture. At the hardware level, the addition of multi-core processors, dedicated cards and various input/output (I/O) devices, such as external memory drives, can necessitate task self-suspensions. Furthermore, the software that utilizes these hardware systems can employ synchronization points and other algorithmic techniques that also result in self-suspensions. Thus, a schedulability test that does not significantly overestimate the temporal resources needed to execute self-suspending task sets would be of benefit to these modern computing systems.

Unfortunately the problem is NP-Hard, as can be shown through an analysis of the interaction of self-suspensions and task deadlines. In practice, the relaxation of a deadline in a self-suspending task set may result in temporal infeasibility. Many uniprocessor, priority-based scheduling algorithms introduce scheduling anomalies since they do not account for this interaction. The most straightforward, correct approach for testing the schedulability of these task sets is to treat self-suspensions as task costs; however, this can result in significant under-utilization of the processor if the duration of self-suspensions is large relative to task costs.

A number of different approaches have been proposed to test the schedulability of self-suspending task sets. The dominant strategy is to upperbound the duration of self-suspensions that needs to be treated as task cost. One approach, testing preemptive task sets with multiple self-suspensions per task under Global Earliest Deadline First (GEDF) on multiple processor systems, has shown significant improvement over the prior art. An earlier test computes the maximum utilization factor for tasks with single self-suspensions scheduled under Earliest Deadline First (EDF) for uniprocessor systems. The test works by analyzing priorities to determine the number of tasks that may be executed during a self-suspension. Other approaches test schedulability by analyzing the worst case response time of tasks due to external blocking events.

The design of scheduling policies for self-suspending task sets also remains a challenge. While EDF has desirable properties for many real-time uniprocessor scheduling problems, certain anomalies arise when scheduling task sets with both self-suspensions and hard deadlines. In some instances, it is possible to schedule a task set under EDF with tight deadlines, while the same task set with looser deadlines fails. Finding an anomaly-free scheduling priority for self-suspending task sets remains an open problem. Accordingly, a schedulability test that determines the feasibility of hard, non-preemptive, self-suspending task sets with multiple self-suspensions for each task is needed.

SUMMARY

The typical assembly task has a number of features that are not addressed together in the prior art for real-time processor scheduling. Assembly tasks are related through precedence constraints (e.g., one task must be completed before another can be started), temporal deadlines (e.g., certain tasks must be completed within a given time window), and wait constraints (e.g., one task must be started a minimum time after a previous task ends). In this document we present a sufficient schedulability criteria computed in polynomial time for task sets that are "well-formed," meaning tasks are related through precedence, deadline and wait constraints according to well-defined composability rules. Empirically, we show that this schedulability test may be computed in seconds for factory-relevant problems, and that the criteria is tight and informative for real-world structured problems. We also provide a scheduling strategy for task sets that meet this schedulability criteria.

In one aspect, in a computer system with a memory storing computer-executable instructions, a method of determining the schedulability of tasks for uniprocessor execution includes executing the instructions by a processing unit such that the computer defines a well-formed, non-preemptive task set and determines whether the task set is schedulable. The task set includes a plurality of tasks, with each task having at least one subtask. The schedulability determination includes estimating a near-optimal amount of temporal resources required to execute the task set.

In one embodiment, at least two subtasks in the task set are related by precedence, a wait constraint, and/or a deadline constraint. At least one of the tasks may have an intra-task deadline constraint. The intra-task deadline constraint may include a hard constraint.

In another embodiment, one of the tasks has a different number of subtasks than another one of the tasks. The number of subtasks in each task may be independent of the number of subtasks in each of the other tasks in the task set. In a further embodiment, the determination of whether the task set is schedulable is made in polynomial time.

In some implementations, the computer performs the step of determining in polynomial time whether a subtask in the task set is schedulable at a specific time. Upon determining that the task set is schedulable, a uniprocessor may be configured to perform the tasks in the task set according to a schedule.

In another aspect, a system for determining the schedulability of tasks for uniprocessor execution includes a memory and a processing unit for executing instructions stored on the memory. Upon executing the instructions, the processing unit defines a well-formed, non-preemptive task set having a plurality of tasks, each task having at least one subtask. The processing unit further determines whether the task set is schedulable by, for example, estimating a near-optimal amount of temporal resources required to execute the task set.

In one embodiment, at least two subtasks in the task set are related by precedence, a wait constraint, and/or a deadline constraint. At least one of the tasks may have an intra-task deadline constraint. The intra-task deadline constraint may include a hard constraint.

In another embodiment, one of the tasks has a different number of subtasks than another one of the tasks. The number of subtasks in each task may be independent of the number of subtasks in each of the other tasks in the task set. In a further embodiment, the processing unit is configured to determine whether the task set is schedulable in polynomial time.

In some implementations, the execution of the instructions further causes the processing unit to determine in polynomial time whether a subtask in the task set is schedulable at a specific time. The processing unit may further configure, upon a determination that the task set is schedulable, a uniprocessor to perform the tasks in the task set according to a schedule.

In a further aspect, in a computer system with a memory storing computer-executable instructions, a method of determining schedulability of a subtask for uniprocessor execution includes executing the instructions by a processing unit such that the computer defines a well-formed, non-preemptive task set and determines in polynomial time whether a subtask in the task set is schedulable at a specific time. The task set includes a plurality of tasks, with each task having at least one subtask.

In one embodiment, at least two subtasks in the task set are related by precedence, a wait constraint, and/or a deadline constraint. At least one of the tasks may have an intra-task deadline constraint.

In another embodiment, the determination of whether the subtask in the task set is schedulable depends on an intra-task deadline constraint of at least one other task in the task set.

In a further implementation, the determination of whether the subtask in the task set is schedulable involves determining whether a first subtask group in the task set can be nested within a slack interval of a second subtask group in the task set. Each subtask within a subtask group may share a common deadline constraint.

In yet another embodiment, the computer determines whether the task set is schedulable based at least in part on the determination of whether the subtask in the task set is schedulable. Upon determining that the task set is schedulable, a uniprocessor may be configured to perform the tasks in the task set according to a schedule.

In yet another aspect, a system for determining the schedulability of a subtask for uniprocessor execution includes a memory and a processing unit for executing instructions stored on the memory. Execution of the instructions causes the processing unit to define a well-formed, non-preemptive task set and determine in polynomial time whether a subtask in the task set is schedulable at a specific time. The task set includes a plurality of tasks, with each task having at least one subtask.

In one embodiment, at least two subtasks in the task set are related by precedence, a wait constraint, and/or a deadline constraint. At least one of the tasks may have an intra-task deadline constraint.

In another embodiment, the processing unit is configured to determine whether the subtask in the task set is schedulable based on an intra-task deadline constraint of at least one other task in the task set.

In a further implementation, in determining whether the subtask in the task set is schedulable, the processing is configured to determine whether a first subtask group in the task set can be nested within a slack interval of a second subtask group in the task set. Each subtask within a subtask group may share a common deadline constraint.

In yet another embodiment, execution of the instructions further causes the processing unit to determine whether the task set is schedulable based at least in part on the determination of whether the subtask in the task set is schedulable. Upon a determination that the task set is schedulable, a uniprocessor may be configured to perform the tasks in the task set according to a schedule.

Other aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, emphasis instead generally being placed upon illustrating the principles of the invention.

FIG. 8 is exemplary pseudocode for a schedulability test according to an embodiment of the invention.

FIG. 9 is exemplary pseudocode for constructing a task superset according to an embodiment of the invention.

FIG. 11 is exemplary pseudocode for a scheduler algorithm according to an embodiment of the invention.

FIG. 12 is exemplary pseudocode for a subtask schedulability test according to an embodiment of the invention.

DETAILED DESCRIPTION

Figure 1:
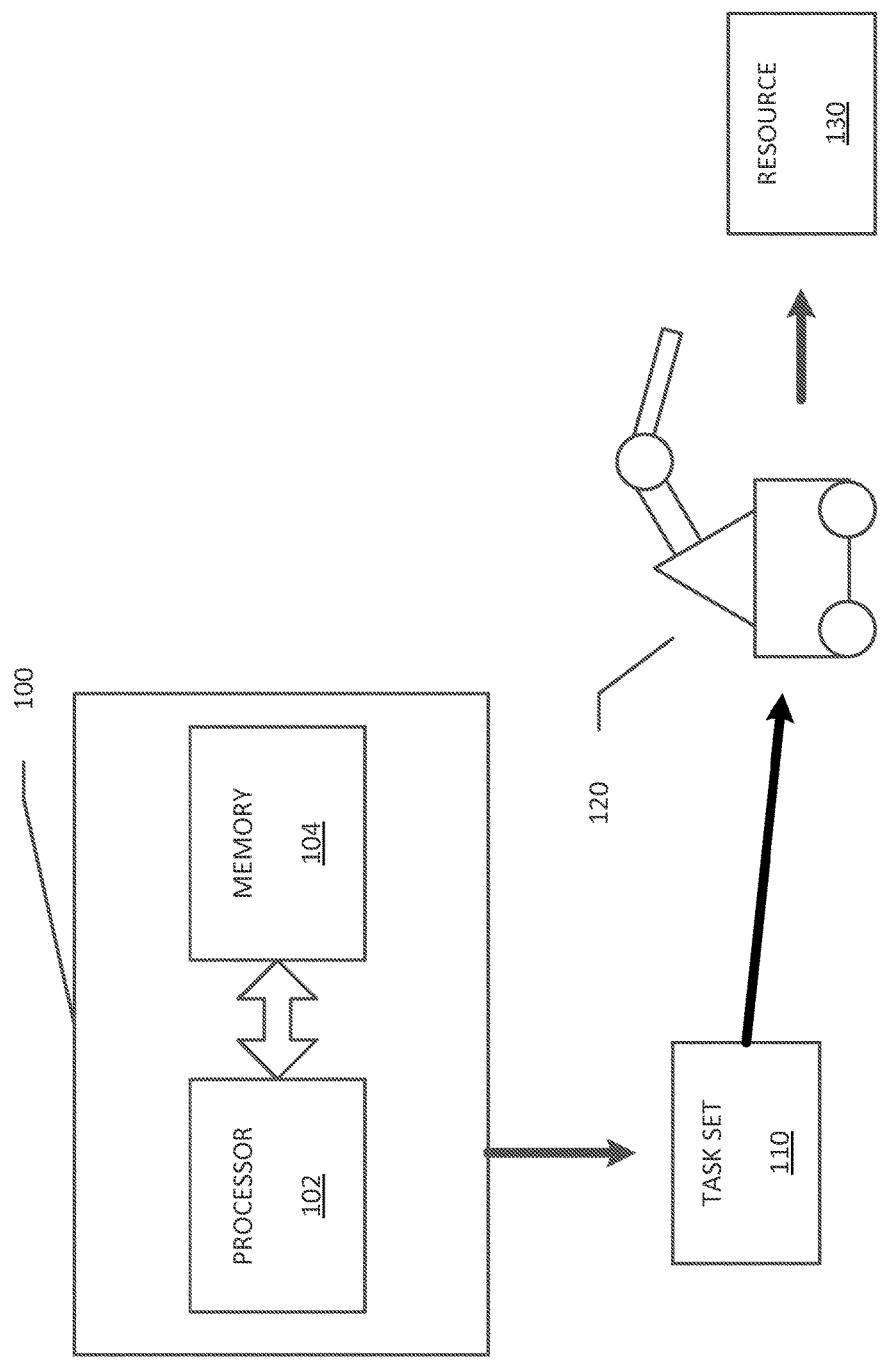
FIG. 1 is a diagram illustrating a task scheduler system interacting with a task performer according to an embodiment of the invention.

In this description, we present several contributions. First, we provide a solution to the open problem of determining the feasibility of hard, periodic, non-preemptive, self-suspending task sets with any number of self-suspensions in each task. We test the schedulability of these task sets by providing an upperbound for the amount of self-suspension time that needs to be treated as task cost. Our test is polynomial in time and, in contrast to prior art, generalizes to non-preemptive task sets with more than one self-suspension per task.

Second, we extend our schedulability test to also handle task sets with deadlines constraining the upperbound temporal difference between the start and finish of two subtasks within the same task. Third, we introduce a new scheduling policy to accompany the schedulability test. We specifically designed this scheduling policy to restrict the behavior of a self-suspending task set so as to provide an analytical basis for an informative schedulability test.

Further, we present a near-optimal method for scheduling under a $j^{th}$ Subtask First scheduling priority. A polynomial-time, online consistency test, call the "Russian Dolls test," is used to determine whether we can "nest" a set of tasks within the slack of another set of tasks. Our scheduling algorithm is not optimal in all cases; in general the problem of sequencing according to both upperbound and lowerbound temporal constraints requires an idling scheduling policy and is known to be NP-complete. However, we show through empirical evaluation that schedules resulting from our algorithm are within a few percent of the best possible schedule.

Recent advances in the accuracy of industrial robots have opened the way for the use of these systems in aerospace manufacturing. Near-term applications include robotic drilling for aircraft assembly and automated composite fiber placement. Robotic solutions provide significant flexibility in operations compared to the current state-of-the-art large gantry, "monument" style automated solutions. The key challenge in harnessing the full capability of these robotic systems is to coordinate the work sharing and scheduling among multiple robots. This requires a carefully choreographed dance to achieve high productivity despite inevitable disturbances due to robot servicing, people working in the same space, and other unanticipated delays in the build process.

We have developed a capability for flexible work sequencing and scheduling (WSS) that is capable of automatically rescheduling a robot's action sequence to adapt to changes in the nominal workplan, while guaranteeing hard scheduling deadlines are met. Previous state-of-the-art scheduling solutions (e.g. disjunctive temporal problem solvers such as TSAT++) take tens of minutes to hours to compute a feasible schedule for a factory-relevant problem. We have developed an alternative, computationally efficient approach for performing this scheduling. In one embodiment, we model robotic and human workers in the system as processors within a computer. The build piece (e.g., an airplane fuselage) is modeled as a shared memory resource that the processors (human and robotic workers) must coordinate to access. The invention disclosed in this document relates, in various embodiments, to the efficient scheduling of a uniprocessor (single robot).

Referring to FIG. 1, embodiments of the invention may be implemented on a computing device in the form of a computer 100 including a processing unit 102 and a memory 104, and a system bus that couples various system components including the memory 104 to the processing unit 102. The computer 100 may be configured to perform the processes described herein to determine the schedulability of a task set and produce a scheduled task set 110. The task set 110 may be used to program a robot 120 or other uniprocessor to perform the tasks according to the scheduled task set 110 on one or more resources 130.

The techniques described herein can further be implemented in digital electronic circuitry, or in computer hardware, firmware, software, or in combinations of them. The techniques can be implemented as a computer program product, i.e., a computer program tangibly embodied in non-transitory medium such as a machine-readable storage device, or to control the operation of a data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer, mobile device, smartphone, tablet, and the like, having a display device, e.g., a CRT (cathode ray tube) or LCD (liquid crystal display) monitor, for displaying information to the user and an input device, e.g., a keyboard, touchscreen, touchpad, mouse or trackball, by which the user can provide input to the computer or other device (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs may be implemented in any programming language. The software programs may be further translated into machine language or virtual machine instructions and stored in a program file in that form. The program file may then be stored on or in one or more of the articles of manufacture.

1. Augmented Task Model

The basic model for self-suspending task sets is shown in Equation 1.

$$\tau_i : (\phi_i, (C_i^1, E_i^1, C_i^2, E_i^2, \ldots, E_i^{m_i-1}, C_i^{m_i}), T_i, D_i) \quad (1)$$

In this model, there is a task set, $\tau$, where all tasks, $\tau_i \in \tau$ must be executed by a uniprocessor. For each task, there are $m_i$ subtasks with $m_i-1$ self-suspension intervals. $C_i^j$ is the worst-case duration of the $j^{th}$ subtask of $\tau_i$, and $E_i^j$ is the worst-case duration of the $j^{th}$ self-suspension interval of $\tau_i$.

Subtasks within a task are dependent, meaning that a subtask $\tau_i^{j+1}$ must start after the finish times of the subtask $\tau_i^j$ and the self-suspension $E_i^j$. $T_i$ and $D_i$ are the period and deadline of $\tau_i$, respectively, where $D_i \leq T_i$. Lastly, a phase offset delays the release of a task, $\tau_i$, by the duration, $\phi_i$, after the start of a new period.

The self-suspending task model shown in Equation 1 provides a solid basis for describing many real-world processor scheduling problems of interest. In this work, we augment the traditional model to provide additional expressiveness, by incorporating deadline constraints that upperbound the temporal difference between the start and finish of two subtasks within a task. We call these deadline constraints intra-task deadlines. We define an intra-task deadline as shown in Equation 2.

$$D_{(i,a),(i,b)} : (f_i^a - s_i^b \leq d_{(i,a),(i,b)}) \quad (2)$$

where $f_i^b$ is the finish time of subtask $\tau_i^b$, $s_i^j$ is the start time of subtask $\tau_i^j$, and $d_{(i,a),(i,b)}$ is the upperbound temporal constraint between the start and finish times of these two subtasks, such that $b > a$. These types of constraints are commonly included in artificial intelligence and operations research scheduling models.

In another embodiment, a well-formed task model is defined as a task set, $\tau$, that is composed of tasks $\tau_i$, $i \in \{1, \ldots n\}$, where each $\tau_i$ has an associated execution time, or cost, $c_i$. The model is well-formed in that tasks are related through upperbound deadlines and lowerbound wait constraints according to a set of primitive combinators defined below. The resulting task model has a well-defined network structure that we leverage to create an empirically tight scheduling policy.

A well-formed network consists of an epoch and terminus task each with zero cost, and a set of intermediate tasks each with non-zero cost. The epoch serves as a trigger for the release of the network. An upperbound temporal constraint on the makespan, m, may be placed on the execution time from the epoch to terminus. Tasks may also be related through upper and lowerbound temporal constraints using the following set of four primitive combinators.

Figure 2:
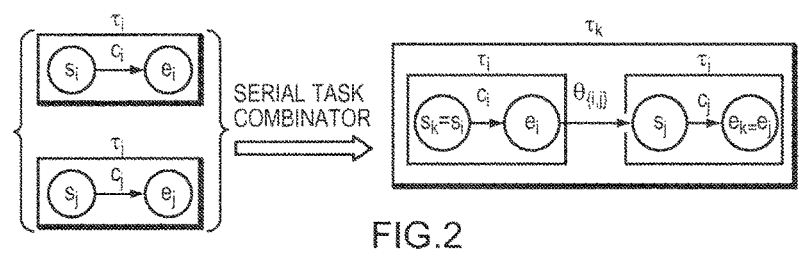
FIG. 2 is a diagram illustrating a serial task combinator according to an embodiment of the invention.

Serial Task Combinator: We define the serial task combinator as the ordering in series of two tasks, $\tau_i$ and $\tau_j$, into a super task, $\tau_k$, where the start of task $\tau_j$ must follow the end of $\tau_i$ after minimum wait time, $\theta_{i,j}$. Similarly, two super tasks, or a task and a super task may be combined with the serial task combinator. FIG. 2 shows an illustration of the serial task combinator.

Figure 3:
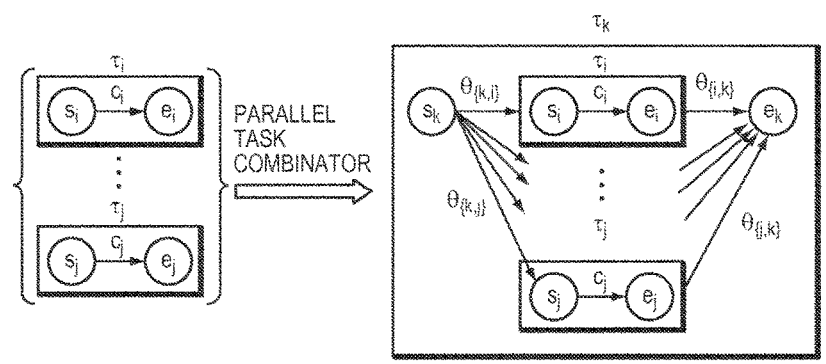
FIG. 3 is a diagram illustrating a parallel task combinator according to an embodiment of the invention.

Parallel Task Combinator: We define the parallel task combinator as the parallelization of a set of tasks, $\{\tau_i, \ldots, \tau_j\}$, into a super task, $\tau_k$, where each task in $\{\tau_i, \ldots, \tau_j\}$ begins a minimum wait time, $\{\theta\{k,i\}, \ldots, \theta\{k,j\}\}$, respectively, after the start of $\tau_k$. Similarly, each task ends a minimum wait time $\{\theta\{i,k\}, \ldots, \theta\{j,k\}\}$ before the end of $\tau_k$. Tasks and super tasks may be combined with the parallel task combinator. FIG. 3 shows an illustration of a parallel task combinator.

Figure 4:
FIG. 4 is a diagram illustrating a task-task deadline combinator according to an embodiment of the invention.

Task-Task Deadline Combinator: We define the task-task deadline combinator, as a constraint, $d_i$, on the upperbound of the allowable duration between the start and finish time of task or super task, $\tau_i$. FIG. 4 shows the graphical illustration of task-task deadline combination. When a task, $\tau_i$, is scheduled with an associated task-task deadline, $d_i$, that deadline constraint is considered active while $s_i \leq t \leq f_i$ where $s_i$ is the start time of $\tau_i$, $t$ is the current time, and $f_i$ is the finish time of $\tau_i$. In the case that $\tau_i$ is not a supertask, the deadline constraint is trivial because non-preemptable tasks execute with a fixed duration, $c$.

Figure 5:
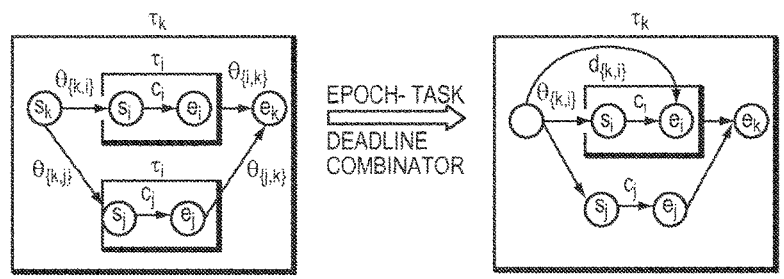
FIG. 5 is a diagram illustrating an epoch-task deadline combinator according to an embodiment of the invention.

Epoch-Task Deadline Combinator: We define the epoch-task deadline combinator as a constraint, $d\{k,i\}$, on the upperbound of the duration between the start time of a supertask, $\tau_k$, formed by the Parallel Task Combinator, and finish time of a task, $\tau_i$. FIG. 5 shows a graphical description of epoch-task deadline combination. When a super task, $\tau_k$, is scheduled and has an associated epoch-task deadline constraint, $d\{k,i\}$, from the start of $\tau_k$ to the end of $\tau_i$, as shown in FIG. 5, that epoch-task deadline is considered active while $s_k \leq t \leq f_i$ where $s_k$ is the start time of $\tau_k$, $t$ is the current time, and $f_i$ is the finish time of $\tau_i$. The task-task and epoch-task deadlines are similar to latency constraints, where latency is defined as a limit on the upperbound duration relating the start of two tasks. The key difference is that the task-task and epoch-task deadline combinators, instead, limit the upperbound duration between the start of one task and the end of another task.

Figure 6:
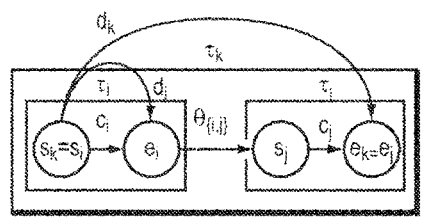
FIG. 6 is a diagram illustrating nested task-task deadline constraints according to an embodiment of the invention.

As a consequence of combination, one task-task deadline constraint may be nested within another task-task deadline constraint as shown in FIG. 6. If a task is involved in one of a set of nested task-task deadlines, then the task is said to be involved in a complex deadline constraint. We define $\{\tau C\ DC\}$ as the set of tasks with complex deadline constraints. FIG. 6 shows two nested task-task deadlines that form complex deadline constraints, where $\{\tau C\ DC\} = \{\tau_i, \tau_j\}$.

Epoch-task deadlines may also be nested to form complex deadline constraints, where each task involved is likewise in the set {τC DC}. To support efficient inferences on the task network structure, we add a restriction on the use of complex deadline constraints as follows: an epoch-task and a task-task deadline cannot be combined to create a complex deadline constraint.

Figure 7:
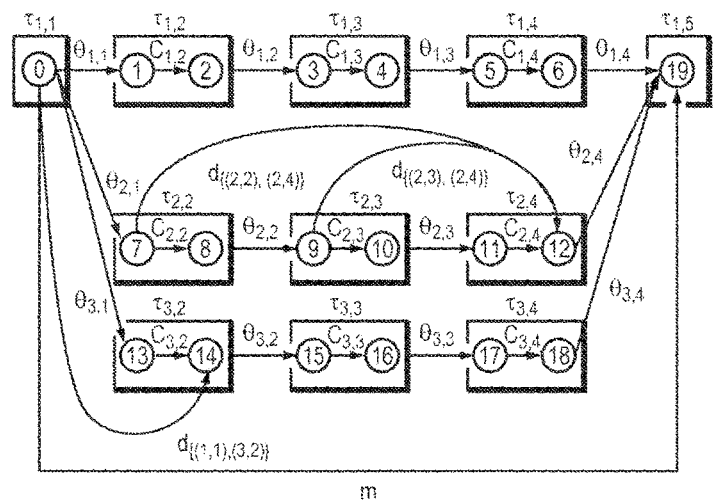
FIG. 7 is a diagram illustrating an exemplary well-formed task network according to an embodiment of the invention.

FIG. 7 shows an example of a well-formed task network constructed using the four primitive combinators. This network is composed of eleven tasks: nine tasks related through serial and parallel combination and one epoch and terminus task; the network has one epoch-task deadline and two task-task deadlines. The two task-task deadlines are complex deadline constraints, because one is nested within the other.

We can represent many real-world constraints using the well-formed task model. For example, serial combination may be applied to encode precedence constraints or denote minimum wait times between tasks. Wait constraints arise, for example, in robotic painting where time is necessary for the paint to cure, or in air traffic scheduling, where landing aircraft must be spaced by a minimum separation time.

The parallel combination encodes choice in the valid sequencing. Parallel and serial combinators together form a partially ordered plan. Task-task and epoch-task deadlines also arise naturally in factory operations and airplane scheduling. For example, a factory supervisor may specify that a sequence of tasks should be accomplished in the first shift, or should be grouped together to be executed within a specified window. Deadlines may also encode the amount of time an aircraft can remain in a holding pattern based on fuel considerations.

2. Terminology

In this section we introduce new terminology to help describe our schedulability test and the execution behavior of self-suspending tasks, which in turn will help us intuitively describe the various components of our schedulability test.

Definition 1: A free subtask, $\tau_i^j \in \tau_{free}$, is a subtask that does not share a deadline constraint with $\tau_i^{j-1}$. In other words, a subtask $\tau_i^j$ is free iff for any deadline $D_{(i,a)(i,b)}$ associated with that task, (j≤a)∨(b<j). We define $\tau_i^1$ as free since there does not exist a preceding subtask.

Definition 2: An embedded subtask, $\tau_i^{j+1} \in \tau_{embedded}$, is a subtask shares a deadline constraint with $\tau_i^j$ (i.e., $\tau_i^{j+1} \not\in \tau_{free}$). $\tau_{free} \cap \tau_{embedded} = \emptyset$.

The intuitive difference between a free and an embedded subtask is as follows: a scheduler has the flexibility to sequence a free subtask relative to the other free subtasks without consideration of intra-task deadlines. On the other hand, the scheduler must take extra consideration to satisfy intra-task deadlines when sequencing an embedded subtask relative to other subtasks.

Definition 3: A free self-suspension, $E_i^j \in E_{free}$, is a self-suspension that suspends two subtasks, $\tau_i^j$ and $\tau_i^{j+1}$, where $\tau_i^{j+1} \in \tau_{free}$.

Definition 4: An embedded self-suspension, $E_i^j \in E_{embedded}$, is a self-suspension that suspends the execution of two subtasks, $\tau_i^j$ and $\tau_i^{j+1}$, where $\tau_i^{j+1} \in \tau_{embedded}$. $E_{free} \cap E_{embedded} = \emptyset$.

In Section 4, we describe how we can use $\tau_{free}$ to reduce processor idle time due to $E_{free}$, and, in turn, analytically upperbound the duration of the self-suspensions that needs to be treated as task cost. We will also derive an upperbound on processor idle time due to $E_{embedded}$.

In Section 6, we describe how we attempt to interleave subtasks within self-suspensions according to specific rules on whether the subtasks and self-suspensions are free or embedded. The next terms we will use to describe how we determine the feasibility of the interleaving of these subtasks and self-suspensions.

Definition 5: A subtask group, $G_i^j$, is a set of subtasks that share a common intra-task deadline constraint. If we have a deadline constraint $D_{(i,a)(i,b)}$, then the subtask group for that deadline constraint would be the $G_i^a = \{\tau_i^a, \tau_i^{a+1}, \ldots, \tau_i^b\}$, where $G_i^a(k)$ returns the $k^{th}$ element of $G_i^a(k)$. Finally, we say that $G_i^a | \subset f \subset G_i^a$ is the set of all subtasks in $G_i^a$ that have not finished executing.

Definition 6: An active intra-task deadline is an intra-task deadline constraint, $D_{(i,a)(i,b)}$, where the processor has started $\tau_i^a$ (or completed) and the processor has not finished $\tau_i^b$.

Definition 7: The set of active subtasks, $\tau_{active}$, are the set of all subtasks associated with active deadlines.

Definition 8: The set of next subtasks, $\tau_{next}$, are the set of all subtasks, $\tau_i^j$, such that the processor has finished $\tau_i^{j-1}$ but not started $\tau_i^j$.

3. Motivating Our $j^{th}$ Subtask First (JSF) Priority Scheduling Policy

Scheduling of self-suspending task sets is challenging because polynomial-time, priority-based approaches such as EDF can result in scheduling anomalies. To construct a tight schedulability test, we desire a priority method of restricting the execution behavior of the task set in a way that allows us to analytically bound the contributions of self-suspensions to processor idle time, without unnecessarily sacrificing processor efficiency.

We restrict behavior using a novel scheduling priority, which we call $j^{th}$ Subtask First (JSF). We formally define the $j^{th}$ Subtask First priority scheduling policy in Definition 5.

Definition 9: $j^{th}$ Subtask First (JSF). We use j to correspond to the subtask index in $\tau_i^j$. A processor executing a set of self-suspending tasks under JSF must execute the $j^{th}$ subtask (free or embedded) of every task before any $j^{th}+1$ free subtask. Furthermore, a processor does not idle if there is an available free subtask unless executing that free task results in temporal infeasibility due to an intra-task deadline constraint.

Enforcing that all $j^{th}$ subtasks are completed before any $j^{th}+1$ free subtasks allows the processor to execute any embedded $k^{th}$ subtasks where k>j as necessary to ensure that intra-task deadlines are satisfied. The JSF priority scheduling policy offers choice among consistency checking algorithms. A simple algorithm to ensure deadlines are satisfied would require that, if a free subtask that triggers a deadline constraint is executed (i.e. $\tau_i^j \in \tau_{free}$, $\tau_i^{j+1} \in \tau_{embedded}$), the subsequent embedded tasks for the associated deadline constraint would then be scheduled as early as possible without the processor executing any other subtasks during this duration.

4. Schedulability Test

To describe how our test works and prove its correctness, we will start with a simplified version of the task set and build to the full task model. We follow the following six steps:

Step 1. We restrict τ such that each task only has two subtasks (i.e., $m_i=2, \forall i$), there are no intra-task deadlines, and all tasks are released at t=0 (i.e., $\phi=0, \forall i$). Here we will introduce our formula for upperbounding the amount of self-suspension time that we treat as task cost, $W_{free}$. Additionally, we say that all tasks have the same period and deadline (i.e., $T_i=D_i=T_j=D_j, \forall i,j \in \{1, 2, \ldots, n\}$). Thus, the hyperperiod of the task set is equal to the period of each task.

Step 2. Next, we allow for general task release times (i.e., $\phi_i \geq 0, \forall i$). In this step, we upperbound processor idle time due to phase offsets, $W_\phi$.

Step 3. Third, we relax the restriction that each task has two subtasks and say that each task can have any number of subtasks.

Step 4. Fourth, we incorporate intra-task deadlines. In this step, we will describe how we calculate an upperbound on processor idle time due to embedded self-suspensions $W_{embedded}$.

Step 5. Fifth, we relax the uniform task deadline restriction and allow for general task deadlines where $D_i \leq T_i, \forall i \in \{1, 2, \ldots, n\}$.

Step 6. Lastly, we relax the uniform periodicity restriction and allow for general task periods where $T_i \neq T_j, \forall i, j \in \{1, 2, \ldots, n\}$.

4.1 Two Subtasks Per Task, No Deadlines, and Zero Phase Offsets

In step one, we consider a task set, $\tau$ with two subtasks per each of the n tasks, no intra-task deadlines, and zero phase offsets (i.e., $\phi_i = 0, \forall i \in n$). Furthermore, we say that task deadlines are equal to task periods, and that all tasks have equal periods (i.e., $T_i = D_i = T_j = D_j, \forall i, j \in \{1, 2, \ldots, n\}$). We assert that one can upperbound the idle time due to the set of all of the $E_i^1$ self-suspensions by analyzing the difference between the duration of the self-suspensions and the duration of the subtasks costs that will be interleaved during the self-suspensions.

We say that the set of all subtasks that might be interleaved during a self-suspension, $E_i^1$, is $B_i^1$. As described by Equation 3, $B_i^j$ is the set of all of the $j^{th}$ and $j^{th}+1$ subtask costs less the subtasks costs for $\tau_i^j$ and $\tau_i^{j+1}$. Note, by definition, $\tau_i^j$ and $\tau_i^{j+1}$ cannot execute during $E_i^j$. We further define an operator $B_i^j(k)$ that provides the $k^{th}$ smallest subtask cost from $B_i^j$. We also restrict $B_i^j$ such that the $j^{th}$ and $j^{th}+1$ subtasks must both be free subtasks if either is to be added. Because we are currently considering task sets with no deadlines, this restriction does not affect the subtasks in $B_i^1$ during this step. In Step 4, we will explain why we make this restriction on the subtasks in $B_i^j$.

For convenience in notation, we say that N is the set of all task indices (i.e., $N = \{i | i \in \{1, 2, \ldots, n\}\}$, where n is the number of tasks in the task set, $\tau$). Without loss of generality, we assume that the first subtasks $\tau_i^1$ execute in the order $i = \{1, 2, \ldots, n\}$.

$$B_i^j = \{C_x^y | x \in N \setminus i, y \in \{j, j+1\}, \tau_x^j \in \tau_{free}, \tau_x^{j+1} \in \tau_{free}\} \quad (3)$$

To upperbound the idle time due to the set of $E_i^1$ self-suspensions, we consider a worst-case interleaving of subtask costs and self-suspension durations, as shown in Equation 6 and Equation 5 where $W^j$ is an upperbound on processor idle time due to the set of $E_i^j$ self-suspensions, and $W_i^j$ is an upperbound on processor idle time due to $E_i^j$. To determine $W^j$, we first consider the difference between each of the $E_i^j$ self-suspensions and the minimum subtask cost that we can guarantee will execute during $E_i^j$ iff $E_i^j$ results in processor idle time. To compute this quantity we provide a minimum bound on the number of free subtasks (Equation 4) that will execute during a self-suspension $E_i^j$. By taking the maximum over all i of $W_i^j$, we upperbound the idle time due to the set of $j^{th}$ self-suspensions.

$$\eta_i^j = \frac{|B_i^j|}{2} - 1 \quad (4)$$

$$W_i^j = \max\left(\left(E_i^j - \sum_{k=1}^{\eta_i^j} B_i^j(k)\right), 0\right) \quad (5)$$

$$W^j = \max_{i | E_i^j \in E_{free}} (W_i^j) \quad (6)$$

To prove that our method is correct, we first show that Equation 4 lowerbounds the number of free subtasks that execute during a self-suspension $E_i^1$, if $E_i^1$ is the dominant contributor to processor idle time. We will prove this by contradiction, assuming that $E_i^1$ is the dominant contributor to idle time and fewer than $$\frac{|B_i^1|}{2} - 1$$

subtasks execute (i.e., are completely interleaved) during $E_i^1$. We perform this analysis for three cases: for i=1, $1 < i = x < n$, and i=n. Second, we will show that, if at least $$\frac{|B_i^1|}{2} - 1$$

subtasks execute during $E_i^1$, then Equation 5 correctly upperbounds idle time due to $E_i^1$. Lastly, we will show that if an $E_i^1$ is the dominant contributor to idle time then Equation 6 holds, meaning $W^j$ is an upperbound on processor idle time due to the set of $E_i^1$ self-suspensions. (In Step 3 we will show that these three equations also hold for all $E_i^j$.)

4.1.1 Proof of Correctness for Equation 4, where j=1.

Proof by Contradiction for i=1. We currently assume that all subtasks are free (i.e., there are no intra-task deadline constraints), thus $$\frac{|B_i^1|}{2} = n.$$

We recall that a processor executing under JSF will execute all $j^{th}$ subtasks before any free $j^{th}+1$ subtask. Thus, after executing the first subtask, $\tau_1^1$, there are n−1 other subtasks that must execute before the processor can execute $\tau_1^2$. Thus, Equation 4 holds for $E_1^1$ irrespective of whether or not $E_1^1$ results in processor idle time.

Corollary 1: From our Proof for i=1, any first subtask, $\tau_x^1$, will have at least n−x subtasks that execute during $E_x^1$ if $E_x^1$ causes processor idle time, (i.e., the remaining n−x first subtasks in $\tau$).

Proof by Contradiction for $1 < i = x < n$. We assume for contradiction that fewer than n−1 subtasks execute during $E_x^1$ and $E_x^1$ is the dominant contributor to processor idle time from the set of first self-suspensions $E_i^1$. We apply Corollary 1 to further constrain our assumption that fewer than x−1 second subtasks execute during $E_x^1$. We consider two cases: 1) fewer than x−1 subtasks are released before $\tau_x^2$ and 2) at least x−1 subtasks are released before $\tau_x^2$.

First, if fewer than x−1 subtasks are released before $r_x^2$ (with release time of $\tau_x^j$ is denoted $r_x^j$), then at least one of the x−1 second subtasks, $\tau_a^2$, is released at or after $r_x^2$. We recall that there is no idle time during $t=[0, f_n^1]$. Thus, $E_a^1$ subsumes any and all processor idle time due to $E_x^1$. In turn, $E_x^1$ cannot be the dominant contributor to processor idle time.

Second, we consider the case where at least x−1 second subtasks are released before $r_x^2$. If we complete x−1 of these subtasks before $r_x^2$ then at least n−1 subtasks execute during $E_x^1$, which is a contradiction. If fewer than x−1 of these subtasks execute before $r_x^2$, then there must exist a continuous non-idle duration between the release of one of the x−1 subtasks, $\tau_a^2$ and the release of $r_x^2$, such that the processor does not have time to finish all of the x−1 released subtasks before $r_x^2$. Therefore, the self-suspension that defines the release of that second subtask, $E_a^2$, subsumes any and all idle time due to $E_x^1$. $E_x^1$ then is not the dominant contributor to processor idle time, which is a contradiction.

Proof by Contradiction for i=n. We show that if fewer than n−1 subtasks execute during $E_n^1$, then $E_n^1$ cannot be the dominant contributor to processor idle time. As in Case 2: i=x, if $r_n^2$ is less than or equal to the release of some other task, $\tau_z^1$, then any idle time due to $E_n^1$ is subsumed by $E_z^1$, thus $E_n^1$ cannot be the dominant contributor to processor idle time. If $\tau_n^2$ is released after any other second subtask and fewer than n−1 subtasks execute after $r_n^2$. Then, for the same reasoning as in Case 2: i=x, any idle time due to $E_n^1$ must be subsumed by another self-suspension. Thus, $E_x^1$ cannot be the dominant contributor to processor idle time if fewer than n−1 subtasks execute during $E_i^1$, where i=n.

4.1.2. Proof of Correctness for Equation 5, where j=1.

Proof by Deduction. If n−1 subtasks execute during $E_i^j$, then the amount of idle time that results from $E_i^j$ is greater than or equal to the duration of $E_i^j$ less the cost of the n−1 subtasks that execute during that self-suspension. We also note that the sum of the costs of the n−1 subtasks that execute during $E_i^j$ must be greater than or equal to the sum of the costs of the n−1 smallest-cost subtasks that could possibly execute during $E_i^j$. We can therefore upperbound the idle time due to $E_i^j$ by subtracting the n−1 smallest-cost subtasks. Next we compute $W_i^1$ as the maximum of zero and $E_i^1$ less the sum of the smallest n−1 smallest-cost subtasks. If $W_i^1$ is equal to zero, then $E_i^1$ is not the dominant contributor to processor idle time, since this would mean that fewer than n−1 subtasks execute during $E_i^1$ (see proof for Equation 4). If $W_i^j$ is greater than zero, then $E_i^1$ may be the dominant contributor to processor idle time, and this idle time due to $E_i^j$ is upperbounded by $W_i^j$.

4.1.3 Proof of Correctness for Equation 6, where j=1.

Proof by Deduction. Here we show that by taking the maximum over all i of $W_i^1$, we upperbound the idle time due to the set of $E_i^1$ self-suspensions. We know from the proof of correctness for Equation 4 that if fewer than n−1 subtasks execute during a self-suspension, $E_i^1$, then that self-suspension cannot be the dominant contributor to idle time. Furthermore, the dominant self-suspension subsumes the idle time due to any other self-suspension. We recall that Equation 5 bounds processor idle time caused by the dominant self-suspension, say $E_q^j$. Thus, we note in Equation 6 that the maximum of the upperbound processor idle time due any other self-suspension and the upperbound for $E_q^j$ is still an upperbound on processor idle time due to the dominant self-suspension.

4.2 Step 2) General Phase Offsets

Next we allow for general task release times (i.e., $\phi_i \geq 0, \forall i$). Phase offsets may result in additional processor idle time. For example, if every task has a phase offset greater than zero, the processor is forced to idle at least until the first task is released. We also observe that, at the initial release of a task set, the largest phase offset of a task set will subsume the other phase offsets. We recall that the index i of the task $\tau_i$ corresponds to the ordering with which its first subtask is executed (i.e. i={1, 2, . . . , n}). We can therefore conservatively upperbound the idle time during t=[0,$f_n^1$] due to the first instance of phase offsets by taking the maximum over all phase offsets, as shown in Equation 7.

The quantity $W_\phi$ computed in Step 2 is summed with $W^1$ computed in Step 1 to conservatively bound the contributions of first self-suspensions and first phase offsets to processor idle time. This summation allows us to relax the assumption in Step 1 that there is no processor idle time during the interval t=[0,$f_n^1$].

$$W_\phi = \max_i \phi_i \tag{7}$$

4.3 Step 3) General Number of Subtasks Per Task

The next step in formulating our schedulability test is incorporating general numbers of subtasks in each task. As in Step 1, our goal is to determine an upperbound on processor idle time that results from the worst-case interleaving of the $j^{th}$ and $j^{th}$+1 subtask costs during the $j^{th}$ self-suspensions. Again, we recall that our formulation for upperbounding idle time due to the $1^{st}$ self-suspensions in actuality was an upperbound for idle time during the interval t=[$f_n^1$,$\max_i(f_i^2)$].

In Step 2, we used this understanding of Equation 6 to upperbound idle time resulting from phase offsets. We said that we needed to determine an upperbound on the idle time between the release of the first instance of each task at t=0 and the finish of $\tau_n^1$. Equivalently, this duration is t=[0,$\max_i, (f_i^1)$].

It follows then that, for each of the $j^{th}$ self-suspensions, we can apply Equation 6 to determine an upperbound on processor idle time during the interval t=[$\max_i(f_i^j)$, $\max_i(f_i^{j+1})$]. The upperbound on total processor idle time for all free self-suspensions in the task set is computed by summing over the contribution of each of the $j^{th}$ self-suspensions as shown in Equation 8.

$$W_{free} = \sum_j W^j = \sum_j \max_{i|E_i^j \in E_{free}} (W_i^j) = \sum_j \max_{i|E_i^j \in E_{free}} \left( \max\left( \left( E_i^j - \sum_{k=1}^{n-1} B_i^j(k) \right), 0 \right) \right) \tag{8}$$

However, we need to be careful in the application of this equation for general task sets with unequal numbers of subtasks per task. Let us consider a scenario were one task, $\tau_i$, has $m_i$ subtasks, and $\tau_x$ has only $m_x=m_i-1$ subtasks. When we upperbound idle time due to the $m_i^{th}-1$ self-suspensions, there is no corresponding subtask $\tau_x^{m_i}$ that could execute during $E_i^{m_i-1}$. We note that $\tau_x^{m_i-1}$ does exist and might execute during $E_i^{m_i-1}$, but we cannot guarantee that it does. Thus, when computing the set of subtasks, $B_i^j$, that may execute during a given self-suspension $E_i^j$, we only add a pair of subtasks $\tau_x^j, \tau_x^{j+1}$ if both $\tau_x^j, \tau_x^{j+1}$ exist, as described by Equation 3. We note that, by inspection, if $\tau_x^j$ were to execute during $E_i^j$, it would only reduce processor idle time.

4.4 Step 4) Intra-Task Deadline Constraints

In Steps 1 and 3, we provided a lowerbound for the number of free subtasks that will execute during a free self-suspension, if that self-suspension produces processor idle time. We then upperbounded the processor idle time due to the set of free self-suspensions by computing the least amount of free task cost that will execute during a given self-suspension. However, our proof assumed no intra-task deadline constraints. Now, we relax this constraint and calculate an upperbound on processor idle time due to embedded self-suspensions $W_{embedded}$.

Recall under the JSF priority scheduling policy, an embedded subtask $\tau_i^{j+1}$ may execute before all $j^{th}$ subtasks are executed, contingent on a temporal consistency check for intra-task deadlines. The implication is that we cannot guarantee that embedded tasks (e.g. $\tau_i^j$ or $\tau_i^{j+1}$) will be interleaved during their associated self-suspensions (e.g., $E_x^j$, $x \in N\setminus i$).

To account for this lack of certainty, we conservatively treat embedded self-suspensions as task cost, as shown in Equations 9 and 10. Equation 9 requires that if a self-suspension, $E_i^j$ is free, then $E_i^j(1-x_i^{j+1})=0$. The formula $(1-x_i^{j+1})$ is used to restrict our sum to only include embedded self-suspensions. Recall that a self-suspension, $E_i^j$ is embedded iff $\tau_i^{j+1}$ is an embedded subtask.

Second, we restrict $B_i^j$ such that the $j^{th}$ and $j^{th}+1$ subtasks must be free subtasks if either is to be added. (We specified this constraint in Step 1, but this restriction did not have an effect because we were considering task sets without intra-task deadlines)

Third, we now must consider cases where $\eta_i^j < n-1$, as described in (Equation 4). We recall that $\eta_i^j = n-1$ if there are no intra-task deadlines; however, with the introduction of these deadline constraints, we can only guarantee that at least $$\frac{|B_i^j|}{2} - 1$$

subtasks will execute during a given $E_i^j$, if $E_i^j$ results in processor idle time.

$$W_{embedded} = \sum_{i=1}^{n} \left( \sum_{j=1}^{m_i-1} E_i^j (q - x_i^{j+1}) \right) \quad (9)$$

$$x_i^j = \begin{cases} 1, & \text{if } \tau_i^j \in \tau_{free} \\ 0, & \text{if } \tau_i^j \in \tau_{embedded} \end{cases} \quad (10)$$

Having bounded the amount of processor idle time due to free and embedded self-suspensions and phase offsets, we now provide an upperbound on the time $H_{UB}^\tau$ the processor will take to complete all instances of each task in the hyperperiod (Equation 11). H denotes the hyperperiod of the task set, and $H_{LB}^\tau$ is defined as the sum over all task costs released during the hyperperiod. Recall that we are still assuming that $T_i=D_i=T_j=D_j, \forall i,j \in N$; thus, there is only one instance of each task in the hyperperiod.

$$H_{UB}^\tau = H_{LB}^\tau + W_{phase} + W_{free} + W_{embedded} \quad (11)$$

$$H_{LB}^\tau = \sum_{i=1}^{n} \frac{H}{T_i} \sum_{j=1}^{m_i} C_i^j \quad (12)$$

4.5 Step 5) Deadlines Less Than or Equal to Periods

Next we allow for tasks to have deadlines less than or equal to the period. We recall that we still restrict the periods such that $T_i=T_j, \forall i,j \in N$ for this step. When we formulated our schedulability test of a self-suspending task set in Equation 11, we calculated an upperbound on the time the processor needs to execute the task set, $H_{UB}^\tau$. Now we seek to upperbound the amount of time required to execute the final subtask $\tau_i^j$ for task $\tau_i$, and we can utilize the methods already developed to upperbound this time.

To compute this bound we consider the largest subset of subtasks in $\tau$, which we define as $\tau|_j \subset \tau$, that might execute before the task deadline for $\tau_i$. If we find that $H_{UB}^{\tau|_j} \leq D^{abs}$, where $D^{abs}$ is the absolute task deadline for $\tau_i$, then we know that a processor scheduling under JSF will satisfy the task deadline for $\tau_i$. We recall that, for Step 5, we have restricted the periods such that there is only one instance of each task in the hyperperiod. Thus, we have $D_{i,1}^{abs} = D_i + \phi_i$. In Step 6, we consider the more general case where each task may have multiple instances within the hyperperiod. For this scenario, the absolute deadline of the $k^{th}$ instance of $\tau_i$ is $D_{i,k}^{abs} = D_i + T_i(k-1) + \phi_i$.

We present an algorithm named testDeadline($\tau, D^{abs}, j$) to perform this test. Pseudocode for testDeadline($\tau, D^{abs}, j$) is shown in FIG. 8. This algorithm requires as input a task set $\tau$, an absolute deadline $D^{abs}$ for task deadline $D_i$, and the j subtask index of the last subtask $\tau_i^j$ associated with $D_i$ (e.g., $j=m_i$ associated with $D_i$ for $\tau_i \in \tau$). The algorithm returns true if a guarantee can be provided that the processor will satisfy $D_i$ under the JSF, and returns false otherwise.

Referring now to FIG. 8, in Lines 1-14, the algorithm computes $\tau|_j$, the set of subtasks that may execute before $D_i$. In the absence of intra-deadline constraints, $\tau|_j$ includes all subtasks $\tau_i^{j'}$ where $i=N$ (recall $N=\{i | i \in \{1, 2, \ldots, n\}\}$) and $j' \in \{1, 2, \ldots, j\}$. In the case an intra-task deadline spans subtask $\tau_x^j$ (in other words, a deadline $D_{(x,a)(x,b)}$ exists where $a \leq j$ and $b > j$), then the processor may be required to execute all embedded subtasks associated with the deadline before executing the final subtask for task $\tau_i$. Therefore the embedded subtasks of $D_{(x,a)(x,b)}$ are also added to the set $\tau|_j$. In Line 15, the algorithm tests the schedulability of $\tau|_j$ using Equation 11.

Next we walk through the pseudocode for testDeadline($\tau, D^{abs}, j$) in detail. Line 1 initializes $\tau|_j$. Line 2 iterates over each task, $\tau_x$, in $\tau$. Line 3 initializes the index of the last subtask from $\tau_x$ that may need to execute before $\tau_i^j$ as $z=j$, assuming no intra-task constraints.

Lines 5-11 search for additional subtasks that may need to execute before $\tau_i^j$ due to intra-task deadlines. If the next subtask, $\tau_x^{z+1}$ does not exist, then $\tau_x^z$ is the last subtask that may need to execute before $\tau_i^j$ (Lines 5-6). The same is true if $\tau_x^{z+1} \in \tau_{free}$, because $\tau_x^{z+1}$ will not execute before $\tau_i^j$ under JSF if $z+1>j$ (Lines 7-8). If $\tau_x^{z+1}$ is an embedded subtask, then it may be executed before $\tau_i^j$, so we increment z, the index of the last subtask, by one (Line 9-10). Finally, Line 13 adds the subtasks collected for $\tau_x$, denoted $\tau_x|_j$, to the task subset, $\tau|_j$.

After constructing our subset $\tau|_j$, we compute an upperbound on the time the processor needs to complete $\tau|_j$ (Line 15). If this duration is less than or equal to the deadline $D^{abs}$ associated with $D_i$ for $\tau_i$, then we can guarantee that the deadline will be satisfied by a processor scheduling under JSF (Line 16). Otherwise, we cannot guarantee the deadline will be satisfied and return false (Line 18). To determine if all task deadlines are satisfied, we call testDeadline($\tau, D^{abs}, j$) once for each task deadline.

4.6 Step 6) General Periods

Thus far, we have established a mechanism for testing the schedulability of a self-suspending task set with general task deadlines less than or equal to the period, general numbers of subtasks in each task, non-zero phase offsets, and intra-task deadlines. We now relax the restriction that $T_i=T_j, \forall i,j$. The principle challenge of relaxing this restriction is there will be any number of task instances in a hyperperiod, whereas before, each task only had one instance.

To determine the schedulability of the task set, we first start by defining a task superset, $\tau^*$, where $\tau^* \supset \tau$. This superset has the same number of tasks as $\tau$ (i.e., n), but each task $\tau^*_i \in \tau^*$ is composed of $$\frac{H}{T_i}$$

instances of $\tau_i \in \tau$. A formal definition is shown in Equation 13, where $C_{i,k}^j$ and $E_{i,k}^j$ are the $k^{th}$ instance of the $j^{th}$ subtask cost and self-suspension of $\tau^*_i$.

$$\tau^*_i:(\phi_i,(C_{i,1}^1,E_{i,1}^1,\ldots,C_{i,1}^{m_i},C_{i,2}^1,E_{i,2}^1,\ldots, C_{i,2}^{m_i},\ldots,C_{i,k}^1,E_{i,k}^1,\ldots,C_{i,k}^{m_i}), D^*_i=H,T^*_i=H) \quad (13)$$

We aim to devise a test where $\tau^*_i$ is schedulable if $H_{UB}^{\tau^*} \leq D^*_i$ and if the task deadline $D_i$ for each release of $\tau_i$ is satisfied for all tasks and releases. This requires three steps.

First we must perform a mapping of subtasks from $\tau$ to $\tau^*$ that guarantees that $\tau^*_i{}^{j+1}$ will be released by the completion time of all other $j^{th}$ subtasks in $\tau^*$. Consider a scenario where we have just completed the last subtask $\tau_{i,k}^j$ of the $k^{th}$ instance of $\tau_i$. We do not know if the first subtask of the next $k+1^{th}$ instance of $\tau_i$ will be released by the time the processor finishes executing the other $j^{th}$ subtasks from $\tau^*$. We would like to shift the index of each subtask in the new instance to some $j' \geq j$ such that we can guarantee the subtask will be released by the completion time of all other $j'-1^{th}$ subtasks.

Second, we need to check that each task deadline $D_{i,k}$ for each instance k of each task $\tau_i$ released during the hyperperiod will be satisfied. To do this check, we compose a paired list of the subtask indices j in $\tau^*$ that correspond to the last subtasks for each task instance, and their associated deadlines. We then apply testDeadline($\tau,D_i,j$) for each pair of deadlines and subtask indices in our list.

Finally, we must determine an upperbound, $H_{UB}^{\tau^*}$, on the temporal resources required to execute $\tau^*$ using Equation 11. If $H_{UB}^{\tau^*} \leq H$, where H is the hyperperiod of $\tau$, then the task set is schedulable under JSF.

We use an algorithm called constructTaskSuperSet($\tau$), presented in FIG. 9, to construct our task superset $\tau^*$. The function constructTaskSuperSet($\tau$) takes as input a self-suspending task set $\tau$ and returns either the superset $\tau^*$ if we can construct the superset, or null if we cannot guarantee that the deadlines for all task instances released during the hyperperiod will be satisfied.

Referring to FIG. 9, in Line 1, we initialize our task superset, $\tau^*$, to include the subtask costs, self-suspensions, phase offsets, and intra-task deadlines of the first instance of each task $\tau_i$ in $\tau$. In Line 2, we initialize a vector I, where I[i] corresponds to the instance number of the last instance of $\tau_i$ that we have added to $\tau^*$. Note that after initialization, I[i]=1 for all i. In Line 3, we initialize a vector J, where J[i] corresponds to the j subtask index of $\tau^*_i{}^j$ for instance I[i], the last task instance added to $\tau^*_i$. The mapping to new subtask indices is constructed in J to ensure that the $j^{th}+1$ subtasks in $\tau^*$ will be released by the time the processor finishes executing the set of $j^{th}$ subtasks.

We use D[i][k] to keep track of the subtasks in $\tau^*$ that correspond to the last subtasks of each instance k of a task $\tau_i$. D[i][k] returns the j subtask index in $\tau^*$ of instance k of $\tau_i$. In Line 4, D[i][k] is initialized to the subtask indices associated with the first instance of each task.

In Line 5, we initialize counter, which we use to iterate through each j subtask index in $\tau^*$. In Line 6 we initialize $H_{LB}$ to zero. $H_{LB}$ will be used to determine whether we can guarantee that a task instance in $\tau$ has been released by the time the processor finishes executing the set of j=counter−1 subtasks in $\tau^*$.

Next we compute the mapping of subtask indices for each of the remaining task instances released during the hyperperiod (Line 7-31). In Line 11, we increment $H_{LB}$ by the sum of the costs of the set of the j=counter−1 subtasks.

In Line 12, we iterate over each task $\tau^*_i$. First we check if there is a remaining instance of $\tau_i$ to add to $\tau^*_i$ (Line 13). If so, we then check whether counter >J[i] (i.e., the current j=counter subtask index is greater than the index of the last subtask we added to $\tau^*_i$) (Line 14).

If the two conditions in Line 13 and 14 are satisfied, we test whether we can guarantee the first subtask of the next instance of $\tau_i$ will be released by the completion of the set of the j=counter−1 subtasks in $\tau^*$ (Line 15). We recall that under JSF, the processor executes all j−1 subtasks before executing a $j^{th}$ free subtask, and, by definition, the first subtask in any task instance is always free. The release time of the next instance of $\tau_i$ is given by $T_i^*I[i]+\phi_i$. Therefore, if the sum of the cost of all subtasks with index j∈{1, 2, ..., counter−1} is greater than the release time of the next task instance, then we can guarantee the next task instance will be released by the time the processor finishes executing the set of j=counter−1 subtasks in $\tau^*$.

We can therefore map the indices of the subtasks of the next instance of $\tau_i$ to subtask indices in $\tau^*_i$ with j=counter+y−1, where y is the subtask index of $\tau_i^y$ in $\tau_i$. Thus, we increment I[i] to indicate that we are considering the next instance of $\tau_i$ (Line 16) and add the next instance of $\tau_i$, including subtask costs, self-suspensions, and intra-task deadlines, to $\tau^*_i$ (Line 17). Next, we set J[i] and D[i][k] to the j subtask index of the subtask we last added to $\tau^*_i$ (Lines 18-19). We will use D[i][k] later to test the task deadlines of the task instances we add to $\tau^*_i$.

In the case where all subtasks of all task instances up to instance I[i], $\forall i$ are guaranteed to complete before the next scheduled release of any task in $\tau$ (i.e, there are no subtasks to execute at j=counter), then counter is not incremented and $H_{LB}$ is set to the earliest next release time of any task instance (Lines 24 and 25). Otherwise, counter is incremented (Line 27). The mapping of subtasks from $\tau$ to $\tau^*$ continues until all remaining task instances released during the hyperperiod are processed. Finally, Lines 31-39 ensure that the superset exists iff each task deadline $D_{i,k}$ for each instance k of each task $\tau_i$ released during the hyperperiod is guaranteed to be satisfied.

In summary, to determine the schedulability of a task set, $\tau$, we call constructTaskSuperSet($\tau$) on $\tau$. If the function call returns null then we cannot guarantee the feasibility of the task set. If the function call successfully returns a task superset, $\tau^*$, then we determine an upperbound, $H_{UB}^{\tau^*}$, on the temporal resources required to execute $\tau^*$ using Equation 11. If $H_{UB}^{\tau^*} \leq H$, where H is the hyperperiod of $\tau$, then the task set is schedulable under JSF. Furthermore the processor executes $\tau$ under JSF according to the j subtask indices of $\tau^*$.

5. Schedulability Test Results and Discussion

In this section, we empirically evaluate the tightness of our schedulability test and analyze its computational complexity. We perform our empirical analysis using randomly generated task sets. The number of subtasks $m_i$ for a task $\tau_i$ is generated according to $m_i$:U(1,2n), where n is the number of tasks. If $m_i=1$, then that task does not have a self-suspension. The subtask cost and self-suspension durations are drawn from uniform distributions $C_i^j$:U(1,10) and $E_i^j$:U(1,10), respectively. Task periods are drawn from a uniform distribution such that $T_i$:U($\Sigma_{i,j}C_i^j$,2$\Sigma_{i,j}C_i^j$). Lastly, task deadlines are drawn from a uniform distribution such that $D_i$:U($\Sigma_{i,j}C_i^j$,$T_i$).

We benchmark our method against the naive approach that treats all self-suspensions as task cost. To our knowledge our method is the first polynomial-time test for hard, periodic, non-preemptive, self-suspending task systems with any number of self-suspensions per task. Other approaches for scheduling self-suspending task sets using model checking with Computational Tree Logic (CTL) are exponential in the number of tasks and do not currently scale to moderately-sized task sets of interest for real-world applications.

5.1 Tightness of the Schedulability Test

The metric we use to evaluate the tightness of our schedulability test is the percentage of self-suspension time our method treats as task cost, as calculated in Equation 14. This provides a comparison between our method and the naive worst-case analysis that treats all self-suspensions as idle time. We evaluate this metric as a function of task cost and the percentage of subtasks that are constrained by intra-task deadline constraints. We note that these parameters are calculated for $\tau^*$ using constructTaskSuperSet($\tau$) and randomly generated task sets $\tau$.

$$\hat{E} = \frac{W_{free} + W_{embedded}}{\sum_{i,j} E_i^j} * 100 \quad (14)$$

Figure 10:
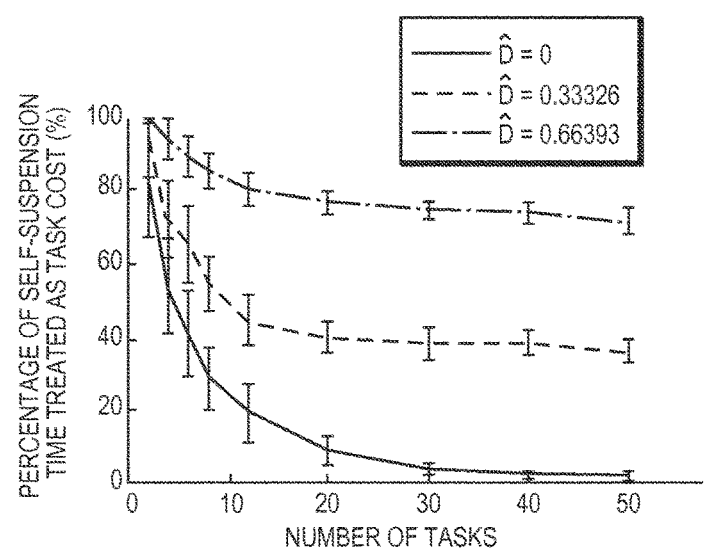
FIG. 10 is a graph illustrating empirical results for the tightness of a schedulability test according to an embodiment of the invention.

FIG. 10 presents the empirical results evaluating the tightness of our schedulability test for randomly generated task sets with 2 to 50 tasks. Each data point and errors bar represents the mean and standard deviation evaluated for fifty randomly generated task sets. $\hat{D}$ denotes the ratio of subtasks that are released during the hyperperiod and constrained by intra-task deadline constraints to the total number of subtasks released during the hyperperiod. Fifty task sets were randomly generated for each data point. We see that for small or highly constrained task sets, the amount of self-suspension time treated as task cost is relatively high ( >50%). However, for problems with relatively fewer intra-task deadline constraints, our schedulability test for the JSF priority scheduling policy produces a near-zero upperbound on processor idle time due to self-suspensions.

5.2 Computational Scalability of the Schedulability Test

Our schedulability test is computed in polynomial time. We bound the time-complexity as follows, noting that $m_{max}$ is the largest number of subtasks in any task in $\tau$ and $T_{min}$ is the shortest period of any task in $\tau$. The complexity of evaluating Equation 11 for $\tau^*$ is upperbounded by $$O\left(n^2 m_{max} \frac{H}{T_{min}}\right)$$

where $$O\left(nm_{max} \frac{H}{T_{min}}\right)$$

bounds the number of self-suspensions in $\tau^*$. The complexity of testDeadline( ) is dominated by evaluating Equation 11. In turn, constructTaskSuperset( ) is dominated by $$O\left(n \frac{H}{T_{min}}\right)$$

calls to testDeadline( ). Thus, for the algorithm we have presented in FIGS. 7 and 8, the computational complexity is $$O\left(n^3 m_{max} \left(\frac{H}{T_{min}}\right)^2\right).$$

However, we note our implementation of the algorithm is more efficient. We reduce the complexity to $$O\left(n^2 m_{max} \frac{H}{T_{min}}\right)$$

by caching the result of intermediate steps in evaluating Equation 11.

6. JSF Scheduling Algorithm

To fully describe our JSF scheduling algorithm, we will first give an overview of the full algorithm. Second, we describe how the algorithm simplifies deadline constraints to better structure the problem. Third, we describe how we use this enhanced problem structure to formulate an online consistency test, which we call the Russian Dolls Test.

6.1 JSF Scheduling Algorithm: Overview

Our JSF scheduling algorithm (FIG. 11) receives as input a self-suspending task set, $\tau$ and terminates after all completing all instance of each task $\tau_i \in \tau$ have been completed. Because these tasks are periodic, scheduling can continue until a user-specified terminating condition; however, for simplicity, the algorithm we present terminates after scheduling through one hyperperiod. The algorithm works by stepping through time scheduling released and unscheduled subtasks in $\tau^*$. If the processor is available and there is released, unscheduled subtask, $\tau_{candidate}$, the algorithm determines whether or not scheduling $\tau_{candidate}$ at the current time t would result in another subtask violating its intra-task deadline constraint. Now, we step through in detail the operation of the algorithm.

Referring to FIG. 11, in Line 1, we construct our task superset from $\tau$ using our schedulability test previously described herein. We recall that $\tau$ is a hard, periodic, self-suspending task set with phase offsets, task deadlines less than or equal to periods, intra-task deadlines, and multiple self-suspensions per task. $\tau^*$ is a task set, composed of each task instance of $\tau$ released during the hyperperiod for $\tau$. The tasks in $\tau^*$ are restricted such that $T^*_i = T^*_j = H$ where H is the hyperperiod for $\tau$, and $T^*_i$ and $T^*_j$ are periods of tasks $\tau^*_i, \tau^*_j$ in $\tau^*$. Most importantly, we know that if $\tau$ is found schedulable according to our schedulability test (Lines 2-4), then our JSF scheduling algorithm will be able to satisfy all task deadlines. Thus, our scheduling algorithm merely needs to satisfy intra-task deadlines by allowing or disallowing the interleaving of certain subtasks and self-suspensions.

In Line 5, we simplify the intra-task deadlines so that we can increase the problem structure. The operation works by mapping multiple, overlapping intra-task deadlines constraints into one intra-task deadline constraint such that, if a scheduling algorithm satisfies the one intra-task deadline constraint, then the multiple, overlapping constraints will also be satisfied. For example, consider two intra-task deadline constraints, $D^*_{(i,a)(i,b)}$ and $D^*_{(i,y)(i,z)}$, such that $a \leq y \leq b$. First, we calculate the tightness of each deadline constraint, as shown in Equation 15. Second, we construct our new intra-task deadline, $D^*_{(i,a),(i,max(b,z))}$, such that the slack provided by $D^*_{(i,a),(i,max(b,z))}$ is equal to the lesser of the slack provided by $D^*_{(i,a)(i,b)}$ and $D^*_{(i,y),(i,z)}$, as shown in Equation 16. Lastly, we remove $D^*_{(i,a)(i,b)}$ and $D^*_{(i,y)(i,z)}$ from the set of intra-task deadline constraints. We continue constructing new intra-task deadline constraints until there are no two deadlines that overlapping (i.e., $\neg \exists D^*_{(i,a)(i,b)}$ and $D^*_{(i,y)(i,z)}$, such that $a \le y \le b$).

$$\delta^*_{(i,a),(i,b)} = d^*_{(i,a),(i,b)} - C_i^{*b} + \sum_{j=a}^{b-1} C_i^{*j} + E_i^{*j} \quad (15)$$

$$d^*_{(i,a),(i,max,z)} = \min(\delta^*_{(i,a),(i,b)}, \delta^*_{(i,y),(i,z)}) - C_i^{*max(b,z)} + \sum_{j=a}^{max(b,z)-1} C_i^{*j} + E_i^{*j} \quad (16)$$

Next, we initialize our time to zero (Line 6) and schedule all tasks in τ released during the hyperperiod (i.e., all $\tau^*_i$ in $\tau^*$) (Lines 7-23). At each step in time, if the processor is not busy executing a task (Line 8), we collect all available subtasks (Line 9). There are three conditions necessary for a subtask, $\tau^{*j}_i$, to be available. First, an available subtask, $\tau^{*j}_i$ must have been released (i.e., $t \ge r^{*j}_i$). We note that we determine the release time of a subtask according to Equation 17. Second, the processor must have neither started nor finished $\tau^{*j}_i$. If $\tau^{*j}_i$ is a free subtask, then all $\tau^{*j-1}_i$ subtasks must have been completed. This third condition is derived directly from the JSF scheduling policy.

$$r_i^{*j} = \begin{cases} \phi_i^*, & \text{if } j = 1 \\ f_i^{*j} + E_i^{*j}, & \text{otherwise} \end{cases} \quad (17)$$

In Lines 10-16, we iterate over all available subtasks. If the next available subtask (Line 11) is temporally consistent according to our online consistency test (Line 12), then we schedule the subtask at time t. We note that we do not enforce a priority between available subtasks. However, one could prioritize the available subtasks according to EDF, RM, or another scheduling priority. For generality in our presentation of the JSF Scheduling Algorithm, we merely prioritize based upon the i index of $\tau^*_i \in \tau^*$. If we are able to schedule a new subtask, we terminate the iteration (Line 14). After either scheduling a new subtask or if there are no temporally consistent, available subtasks, we increment the clock (Line 21). If all tasks (i.e. all subtask) in $\tau^*$ have been scheduled, then the scheduling operation has completed (Line 19).

6.2 Russian Dolls Test

The Russian Dolls Test is a method for determining whether or not scheduling a candidate subtask, $\tau_{candidate}$, at time t, will result in a temporally consistent schedule. Consider two deadlines, $D_{(i,a)(i,b)}$ and $D_{(x,y),(x,z)}$ such that $D_{(i,a)(i,b)} \le D_{(x,y),(x,z)}$, with associated subtask groups $G_i^j$ and $G_x^y$. Furthermore, the processor has just finished executing $\tau_x^w$, where $y \le w < z$, and we want to determine whether or not we can next schedule $\tau_{candidate}$, where $\tau_{candidate} = \tau_i^a$, or if we must continue on to some other available task. To answer this question, the Russian Dolls Test evaluates whether or not we can nest the amount of time that the processor will be busy executing $G_i^a$ within the slack of $D_{(x,y),(x,y+z)}$. If this nesting is possible, then we are able to execute $\tau_i^a$ and still guarantee that the remaining subtasks in $G_i^a$ and $G_x^y$ can satisfy their deadlines. Otherwise, we assume that scheduling $G_i^a$ at the current time will result in temporal infeasibility for the remaining subtasks in $G_x^y$.

To understand how the Russian Dolls Test works, we must know three pieces of information about $\tau_{candidate}$, and $\tau_{active}$. We recall an in intra-task deadline, $D_{(i,a),(i,b)}$, is active if the processor has started $\tau_i^a$ and has not finished $\tau_i^b$. In turn, a subtask is in $\tau_{active}$ if it is associated with an active deadline.

Definition 10: If $\tau_i^j$ is the first, unexecuted subtask in $G_i^j$ associated with $D_{(i,a),(i,b)}$, where $a \le j \le b$, then with $t_{max}I_i^j$ is the remaining time available to execute the unexecuted subtasks in $G_i^j$. We compute $t_{max}I_i^j$ using Equation 18. If there is no intra-task deadline associate with $\tau_i^j$, then $t_{max}I_i^j = C_i^j$.

$$t_{max}|_i^j = \min\left[ \begin{array}{c} D_{(i,a),(i,b)} + s_i^a \\ T - \left( \sum_{q=b+1}^{m_i} C_i^q + E_i^{q-1} \right) \end{array} \right] - t, \quad (18)$$

$$\forall j \in \{a, a+1, \ldots, b\}$$

Definition 11: If $\tau_i^j$ is the first, unexecuted subtask in $G_i^j$, associated with $D_{(i,a),(i,b)}$, where $a \le j \le b$, then $t_{min}|i^j$ is the a lowerbound on the time the processor will be occupied executing the remaining subtasks in $G_i^j$. We compute $t_{min}|i^j$ using Equation 19. This method treats self-suspensions as task cost. If there is no intra-task deadline associate with $\tau_i^j$, then $t_{min}|_i^j = C_i^j$.

$$t_{min}(\tau_i^j) = C_i^b + \sum_{q=j}^{b-1} C_i^q + E_i^q \quad (19)$$

Definition 12: $t_\delta|_i^j$ is the slack time available for the processor to execute subtasks not in the $G_i^j$. This duration is equal to the difference between $t_{max}$ and $t_{min}$.

$$t_\delta(D_{(i,j)}) = t_{max}|_i^j - t_{mine}|_i^j \quad (20)$$

Having defined these, we can now formally describe the Russian Dolls Test.

Definition 13: The Russian Dolls Test determines whether or not we can schedule $\tau_{candidate} = \tau_i^j$ at time t by first considering the direct execution $\tau_{candidate}$ at t, and second, if there is a deadline $D_{(i,j),(i,b)}$, considering the activation of this deadline.

To check the first consideration, we can merely evaluate whether the cost of $\tau_{candidate}$ (i.e., $C_i^j$) is less than or equal to the slack of every active deadline. For the second consideration, if there is a deadline $D_{(x,w),(x,z)}$ such that x=i and w=j, then we must consider the indirect effects of activating $D_{(i,j),(i,z)}$ on the processor after executing $\tau_i^j$. If $\{\tau_i^{j+1}, \ldots, \tau_i^b\}$ is the set of all unexecuted tasks in $G_i^j$ after executing $\tau_i^j$, then we must ensure that the can nest amongst the other active subtasks. If, for all active deadlines $D_{(x,w),(x,z)}$, where $\tau_x^y \in \tau_{next}$, we can nest $\{\tau_i^{j+1}, \ldots, \tau_i^b\}$ within the slack of $\{\tau_x^y, \ldots, \tau_x^z\}$ or vice versa, then we can guarantee that the processor will find a feasible schedule.

We note that if a candidate subtask, $\tau_{candidate} = \tau_i^j$ with associated deadline $D_{(i,j),(i,z)}$, passes the Russian Dolls Test, we do not need to re-test $D_{(i,j),(i,z)}$ when attempting to execute any subtask in the set $\{\tau_i^{j+1}, \ldots, \tau_i^z\}$. For the processor to execute a subtask in $\{\tau_i^{j+1}, \ldots, \tau_i^z\}$, we merely need to test whether the cost of the subtask is less than or equal to the slack of every other active deadlines not including $D_{(i,j),(i,z)}$.

We provide pseudocode to describe the Russian Dolls Test in FIG. 12. In Line 1, we test whether or not $\tau_{candidate}$ will active a deadline $D_{(x,w),(x,z)}$, where x=i and w=j. If so, we determine the parameters $t_{max}$, $t_{min}$, and $t_\delta$ for $\{\tau_i^{j+1}, \ldots, \tau_i^z\}$ in Lines 3-5. In Lines 7-25, we determine whether we can perform the nesting of deadlines and associated active subtasks. We iterate over all subtasks that are active and next. For a subtask, $\tau_x^y$ to be in active and next, then $\tau_x^{y-1}$ must have been completed and there must be an intra-task deadline $D_{(x,w),(x,z)}$ such that w≤y≤z. If the $r^{th}$ subtask in the set of active and next subtasks is not the equal to the candidate subtask, then we proceed with testing the $r^{th}$ subtask in this set. In Lines 11-13, we compute $t_{max}$, $t_{min}$, and $t_\delta$ for the unexecuted subtasks in $\tau_x^y$ (i.e., $\{\tau_x^y, \ldots, \tau_x^z\}$).

In Lines 14-16, we evaluate the first consideration of the Russian Dolls Test: whether the cost of $\tau_{candidate}$ (i.e., $C_i^j$) is less than or equal to the slack of $D_{(x,w),(x,z)}$. If not, then executing $\tau_{candidate}$ at time t will directly result in $\tau_x^y$ missing its deadline, so we return that the nesting is not possible (Line 15). Otherwise, we proceed. Next, we evaluate the second consideration of the Russian Dolls test: if there is a deadline $D_{(x,w),(x,z)}$ such that x=i and w=j, then we must consider the indirect effects of activating $D_{(i,j),(i,b)}$ on the processor after executing $\tau_i^j$. If there is such a deadline $D_{(i,j),(i,z)}$ (Line 17), then we consider whether we can nest the execution of $\{\tau_i^{j+1}, \ldots, \tau_i^b\}$ within the slack of $D_{(x,w),(x,z)}$ or nest the execution of $\{\tau_x^y, \ldots, \tau_x^z\}$ within the slack of $D_{(i,j),(i,b)}$ (Line 18). If not, then we cannot guarantee that all subtasks in these sets (i.e., $\{\tau_i^{j+1}, \ldots, \tau_i^b\} \cup \{\tau_x^y, \ldots, \tau_x^y\}$) will meet their deadline requirements, so we return false (Line 19). After iterating over all active, next subtasks, if we do not meet a failure condition, then we may execute $\tau_{candidate}$ at time t.

7. Scheduler Results

In this section, we empirically validate the tightness of the scheduler and analyze its computational complexity. We perform our empirical analysis using randomly generated task sets. The number of subtasks $m_i$ for a task $\tau_i$ is generated according to $m_i$:U(1,2n), where n is the number of tasks. If $m_i=1$, then that task does not have a self-suspension. The subtask cost and self-suspension durations are drawn from uniform distributions $C_i^j$:U(1,10) and $E_i^j$:U(1,10), respectively. Task periods are drawn from a uniform distribution such that $T_i$:U($\Sigma_{i,j}C_i^j$, $2\Sigma_{i,j}C_i^j$). Lastly, task deadlines are drawn from a uniform distribution such that $D_i$:U($\Sigma_{i,j}C_i^j$, $T_i$).

7.1 Empirical Validation

The metric we use to evaluate the tightness of our JSF Scheduling Algorithm is similar to the metric we used above to test the tightness of our Schedulability Test. For our Schedulability Test, we consider the percentage of self-suspension time our method treats as task cost. This measure provides a comparison between our schedulability test and the naive worst-case analysis that treats all self-suspensions as idle time. For our JSF Scheduling Algorithm, we consider the percentage of self-suspension time that the processor actually is idle.

Figure 13:
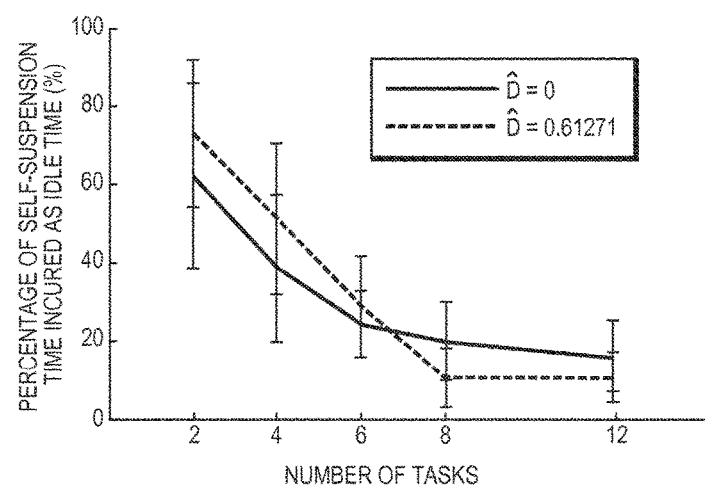
FIG. 13 is a graph illustrating the performance of a task scheduler according to an embodiment of the invention.

FIG. 13 presents the empirical results evaluating the tightness of our scheduler for randomly generated task sets with 2 to 12 tasks. Each data point and errors bar represents the mean and standard deviation evaluated for ten randomly generated task sets. $\hat{D}$ denotes the ratio of subtasks that are released during the hyperperiod and constrained by intra-task deadline constraints to the total number of subtasks released during the hyperperiod. We see the amount of amount idle time due to self-suspensions normalized to the total duration of the self-suspensions is inversely proportional to problem size. For large problem sizes, our JSF scheduling algorithm produces a near-zero amount of idle time due to self-suspensions relative to the total duration of all self-suspensions released during the hyperperiod.

7.2 Computational Complexity

We upperbound the computational complexity of our JSF Scheduling Algorithm for each time step. At each time step, the processor must consider n tasks in the worst case. For each of the n tasks, the scheduler would call russianDollsTest($\tau_i^j$). In the worst case, the number of active deadlines is upperbounded by n; thus, the complexity of the Russian Dolls Test is O(n). In turn, the JSF Scheduling algorithm performs at most $O(n^2)$ operations for each time step.

Certain embodiments of the present invention are described above. It is, however, expressly noted that the present invention is not limited to those embodiments, but rather the intention is that additions and modifications to what is expressly described herein are also included within the scope of the invention. Moreover, it is to be understood that the features of the various embodiments described herein are not mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention. As such, the invention is not to be defined only by the preceding illustrative description, but rather by the claims.

We claim:

1. In a system comprising at least one computer having at least one memory storing computer-executable instructions, a method of determining schedulability of tasks for uniprocessor execution, the method comprising:
    executing the instructions by at least one processing unit, the execution of the instructions resulting in the at least one computer performing the steps of:
        receiving a well-formed, non-preemptive task set comprising a plurality of tasks, each task having a period and at least one subtask, wherein the task set is designated for execution by a uniprocessor;
        performing a schedulability test on the task set by:
            constructing, from the task set, a task superset defining relationships among subtasks of tasks in the task set, wherein the task superset comprises a number of tasks corresponding to a number of tasks in the task set, each task in the task superset comprising a plurality of instances of a corresponding task in the task set;
            calculating an upper bound on temporal resources required to execute the task superset; and
            determining whether the task set is schedulable based on whether the upper bound exceeds a hyperperiod of the task set, wherein the hyperperiod of the task set comprises a sum of the periods of the tasks in the task set; and
        upon determining that the task set is schedulable, configuring the uniprocessor to perform the tasks in the task set according to a schedule.

2. The method of claim 1, wherein at least two subtasks in the task set are related by at least one of precedence, a wait constraint, and a deadline constraint.

3. The method of claim 2, wherein at least one of the tasks in the task set comprises an intra-task deadline constraint.

4. The method of claim 3, wherein the intra-task deadline constraint comprises a hard constraint.

5. The method of claim 1, wherein a first one of the tasks in the task set has a first number of subtasks and a second one of the tasks in the task set has a second number of subtasks, the second number of subtasks being different from the first number of subtasks.

6. The method of claim 5, wherein the number of subtasks in each task in the task set is independent of the number of subtasks in each of the other tasks in the task set.

7. The method of claim 1, wherein the schedulability test is performed in polynomial time.

8. The method of claim 1, wherein the execution of the instructions further results in the at least one computer performing the step of determining in polynomial time whether a subtask in the task set is schedulable at a specific time.

9. The method of claim 1, wherein the plurality of instances of a corresponding task in the task set comprises a number of instances equal to the hyperperiod of the task set divided by a period of the corresponding task in the task set.

10. A system for determining schedulability of tasks for uniprocessor execution, the system comprising:
    at least one memory storing computer-executable instructions; and
    at least one processing unit for executing the instructions, wherein execution of the instructions causes the at least one processing unit to:
        receive a well-formed, non-preemptive task set comprising a plurality of tasks, each task having a period and at least one subtask, wherein the task set is designated for execution by a uniprocessor;
        perform a schedulability test on the task set by:
            constructing, from the task set, a task superset defining relationships among subtasks of tasks in the task set, wherein the task superset comprises a number of tasks corresponding to a number of tasks in the task set, each task in the task superset comprising a plurality of instances of a corresponding task in the task set;
            calculating an upper bound on temporal resources required to execute the task superset; and
            determining whether the task set is schedulable based on whether the upper bound exceeds a hyperperiod of the task set, wherein the hyperperiod of the task set comprises a sum of the periods of the tasks in the task set; and
        upon determining that the task set is schedulable, configure the uniprocessor to perform the tasks in the task set according to a schedule.

11. The system of claim 10, wherein at least two subtasks in the task set are related by at least one of precedence, a wait constraint, and a deadline constraint.

12. The system of claim 11, wherein at least one of the tasks in the task set comprises an intra-task deadline constraint.

13. The system of claim 12, wherein the intra-task deadline constraint comprises a hard constraint.

14. The system of claim 10, wherein a first one of the tasks in the task set has a first number of subtasks and a second one of the tasks in the task set has a second number of subtasks, the second number of subtasks being different from the first number of subtasks.

15. The system of claim 14, wherein the number of subtasks in each task in the task set is independent of the number of subtasks in each of the other tasks in the task set.

16. The system of claim 10, wherein the at least one processing unit, in executing the instructions, is configured to perform the schedulability test in polynomial time.

17. The system of claim 10, wherein the execution of the instructions further causes the at least one processing unit to determine in polynomial time whether a subtask in the task set is schedulable at a specific time.

18. In a system comprising at least one computer having at least one memory storing computer-executable instructions, a method of determining schedulability of a subtask for uniprocessor execution, the method comprising:
    executing the instructions by at least one processing unit, the execution of the instructions resulting in the at least one computer performing the steps of:
        receiving a well-formed, non-preemptive task set comprising a plurality of tasks, each task having at least one subtask, wherein the task set is designated for execution by a uniprocessor;
        determining whether the task set can be scheduled according to a particular scheduling policy given constraints relating particular tasks in the task set to each other by calculating an upper bound on temporal resources required to execute a task superset constructed from the task set, wherein the task superset comprises a number of tasks corresponding to a number of tasks in the task set, each task in the task superset comprising a plurality of instances of a corresponding task in the task set;
        generating a schedule for the task set using the particular scheduling policy, the generating comprising determining in polynomial time whether a particular subtask in the task set is schedulable at a specific time; and
        upon determining that the task set can be scheduled, configuring a uniprocessor to perform the tasks in the task set according to the schedule.

19. The method of claim 18, wherein at least two subtasks in the task set are related by at least one of precedence, a wait constraint, and a deadline constraint.

20. The method of claim 19, wherein at least one of the tasks in the task set comprises an intra-task deadline constraint.

21. The method of claim 19, wherein the determination of whether the particular subtask in the task set is schedulable is based at least in part on an intra-task deadline constraint of at least one other task in the task set.

22. The method of claim 18, wherein the determination of whether the particular subtask in the task set is schedulable comprises determining whether a first subtask group in the task set can be nested within a slack interval of a second subtask group in the task set.

23. The method of claim 22, wherein each subtask within a subtask group shares a common deadline constraint.

24. A system for determining schedulability of a subtask for uniprocessor execution, the system comprising:
    at least one memory storing computer-executable instructions; and
    at least one processing unit for executing the instructions, wherein execution of the instructions causes the at least one processing unit to:
        receive a well-formed, non-preemptive task set comprising a plurality of tasks, each task having at least one subtask, wherein the task set is designated for execution by a uniprocessor;
        determine whether the task set can be scheduled according to a particular scheduling policy given constraints relating particular tasks in the task set to each other by calculating an upper bound on temporal resources required to execute a task superset constructed from the task set, wherein the task superset comprises a number of tasks corresponding to a number of tasks in the task set, each task in the task superset comprising a plurality of instances of a corresponding task in the task set;

generate a schedule for the task set using the particular scheduling policy, the generation of the schedule comprising determining in polynomial time whether a particular subtask in the task set is schedulable at a specific time; and upon a determination that the task set can be scheduled, configure a uniprocessor to perform the tasks in the task set according to the schedule.

25. The system of claim 24, wherein at least two subtasks in the task set are related by at least one of precedence, a wait constraint, and a deadline constraint.

26. The system of claim 25, wherein at least one of the tasks in the task set comprises an intra-task deadline constraint.

27. The system of claim 25, wherein the at least one processing unit, in executing the instructions, is configured to determine whether the particular subtask in the task set is schedulable based at least in part on an intra-task deadline constraint of at least one other task in the task set.

28. The system of claim 24, wherein the at least one processing unit, in determining whether the particular subtask in the task set is schedulable, determines whether a first subtask group in the task set can be nested within a slack interval of a second subtask group in the task set.

29. The system of claim 28, wherein each subtask within a subtask group shares a common deadline constraint.

\* \* \* \* \*